(12) United States Patent
Ma et al.

(10) Patent No.: US 11,649,185 B2
(45) Date of Patent: May 16, 2023

(54) AUTOMATED LARGE OUTSIDE DIAMETER PREFORM TIPPING PROCESS AND RESULTING GLASS PREFORMS

(71) Applicant: Heraeus Quartz North America LLC, Buford, GA (US)

(72) Inventors: Qiulin Ma, Alpharetta, GA (US); Kai Huei Chang, Decatur, GA (US)

(73) Assignee: HERAEUS QUARTZ NORTH AMERICA LLC, Buford, GA (US)

( * ) Notice: Subject to any disclaimer, the term of this patent is extended or adjusted under 35 U.S.C. 154(b) by 154 days.

(21) Appl. No.: 16/739,988

(22) Filed: Jan. 10, 2020

(65) Prior Publication Data

US 2020/0223737 A1 Jul. 16, 2020

Related U.S. Application Data

(60) Provisional application No. 62/792,562, filed on Jan. 15, 2019.

(51) Int. Cl.
*C03B 9/36* (2006.01)
*C03B 9/38* (2006.01)
(Continued)

(52) U.S. Cl.
CPC .... *C03B 37/0126* (2013.01); *C03B 37/01257* (2013.01); *C03B 37/07* (2013.01)

(58) Field of Classification Search
CPC . C03B 37/07; C03B 37/0126; C03B 37/1257; C03B 37/0124; C03B 37/01251; C03B 37/012
(Continued)

(56) References Cited

U.S. PATENT DOCUMENTS 5,968,221 A * 10/1999 Blais ..................... C03B 23/043
65/435
6,386,001 B1 * 5/2002 Shimizu ............ C03B 37/01202
65/435
(Continued)

FOREIGN PATENT DOCUMENTS

CN 85104138 A 11/1986
CN 1081654 A 2/1994
(Continued)

OTHER PUBLICATIONS

Liu, Songke, "Process Model and Control System for the Glass Fiber Drawing Process" (2010). Graduate Theses, Dissertations, and Problem Reports. 3006. https://researchrepository.wvu.edu/etd/3006 (Year: 2010).*

(Continued)

*Primary Examiner* — Galen H Hauth
*Assistant Examiner* — Steven S Lee
(74) *Attorney, Agent, or Firm* — Panitch Schwarze Belisario & Nadel LLP

(57) ABSTRACT

An automated large outside diameter preform tipping process. A zone of the preform is heated inside a furnace and softened. The preform tip is shaped and the process is controlled by the movement of the glass above and below the heating zone and by sensing the weight of the lower part of the preform, which in effect is a measure of the viscosity of the softened material. Once the correct viscosity is reached, the bottom holder is moved away from the top holder with a non-linear, accelerated velocity profile (derived from the FEM simulation of glass flow) which is precisely programmed and controlled so that the preform tip is optimally shaped (usually short and sharp tipped) with minimum waste and waveguide distortion when drawn into a fiber. The same concept of the non-linear, accelerated (Continued)

velocity profile can also be applied to other tipping processes such as horizontal preform tipping processes.

16 Claims, 23 Drawing Sheets

(51) Int. Cl.
  *C03B 17/04* (2006.01)
  *C03B 37/012* (2006.01)
  *C03B 37/07* (2006.01)
(58) Field of Classification Search
  USPC .............................................................. 65/406
  See application file for complete search history.

(56) References Cited

U.S. PATENT DOCUMENTS

| | | | | |
|---|---|---|---|---|
| 6,396,966 | B1 * | 5/2002 | Lewis | C23C 14/225 385/12 |
| 6,532,776 | B1 * | 3/2003 | Suzuki | C03B 29/00 65/433 |
| 6,644,069 | B2 | 11/2003 | Kohmura et al. | |
| 6,779,363 | B1 * | 8/2004 | Craft | C03B 37/01251 65/435 |
| 2003/0024272 | A1 * | 2/2003 | Naka | C03B 37/02745 65/486 |
| 2005/0144987 | A1 * | 7/2005 | Petitfrere | C03B 37/01251 65/435 |
| 2006/0207293 | A1 | 9/2006 | Sowa et al. | |
| 2007/0169515 | A1 | 7/2007 | Tobisaka et al. | |
| 2007/0245773 | A1 | 10/2007 | Peekhaus et al. | |
| 2015/0218031 | A1 | 8/2015 | Otosaka | |
| 2017/0320768 | A1 * | 11/2017 | Ma | C03B 37/01225 |
| 2018/0145752 | A1 * | 5/2018 | Ma | H04B 10/2507 |

FOREIGN PATENT DOCUMENTS

| | | | | |
|---|---|---|---|---|
| CN | 1457324 | A | | 11/2003 |
| DE | 19914507 | | | 10/2000 |
| DE | 102004039645 | | | 1/2006 |
| EP | 0501429 | A1 * | 9/1992 | ....... C03B 37/01257 |
| EP | 1328481 | B1 * | 8/2007 | ....... C03B 37/01251 |
| EP | 3243804 | | | 11/2017 |
| JP | S56014441 | | | 2/1981 |
| JP | S60186431 | | | 9/1985 |
| JP | S61251536 | | | 11/1986 |
| JP | H0570165 | A * | 3/1993 | ......... C03B 37/0124 |
| JP | H0656453 | A * | 3/1994 | ......... C03B 37/0124 |
| JP | H07330362 | | | 12/1995 |
| JP | H8277138 | | | 10/1996 |
| JP | H08310825 | | | 11/1996 |
| JP | 2598339 | B2 * | 4/1997 | ......... C03B 37/0124 |
| JP | H11109142 | A * | 4/1999 | ......... C03B 37/0124 |
| JP | 2000063140 | A * | 2/2000 | ......... C03B 37/0124 |
| JP | 2000203864 | A * | 7/2000 | ........... C03B 23/047 |
| JP | 2001010839 | | | 1/2001 |
| JP | 2001294439 | A * | 10/2001 | ....... C03B 37/01211 |
| JP | 2002053333 | A * | 2/2002 | ....... C03B 37/01211 |
| JP | 2002080238 | | | 3/2002 |
| JP | 2003277092 | | | 10/2003 |
| JP | 2004002140 | A * | 1/2004 | ....... C03B 37/01245 |
| JP | 2004137095 | A * | 5/2004 | ....... C03B 37/01245 |
| JP | 2005119933 | A * | 5/2005 | ......... C03B 37/0126 |
| JP | 2005145765 | A * | 6/2005 | ....... C03B 37/01242 |
| JP | 2006193397 | A * | 7/2006 | ....... C03B 37/01242 |
| JP | 4271125 | B2 | | 6/2009 |
| JP | 2010173933 | A | | 8/2010 |
| JP | 4728605 | B2 | | 7/2011 |
| KR | 10-20050095547 | A | | 9/2005 |
| WO | 2000/059838 | | | 10/2000 |
| WO | WO-0059838 | A1 * | 10/2000 | ....... B29D 11/00721 |
| WO | 2005/009913 | | | 2/2005 |
| WO | 2016/022151 | | | 2/2016 |
| WO | 2016/060646 | | | 4/2016 |
| WO | 2016/118144 | | | 7/2016 |

OTHER PUBLICATIONS

Liu, Songke "Process Model and Control System for the Glass Fiber Drawing Process" (2010). Graduate Theses, Dissertations, and Problem Reports. 3006. https://reserachrepository.wvu.edu/etf/3006 (Year: 2010).*

Extended European Search Report (EESR) dated May 20, 2020 by the European Patent Office for counterpart European Patent Application No. 20150939.5.

First Examination Report dated Jul. 16, 2021 by the Indian Patent Office for counterpart Indian Patent Application No. 202044001394.

Decision to Grant a Patent dated Mar. 1, 2021 by the Japanese Patent Office for counterpart Japanese Patent Application No. 2020-003759 (with English translation attached).

Office Action dated Jan. 7, 2022 by the China National Intellectual Property Administration for counterpart Chinese Patent Application No. 202010041691.5 (with English translations).

* cited by examiner

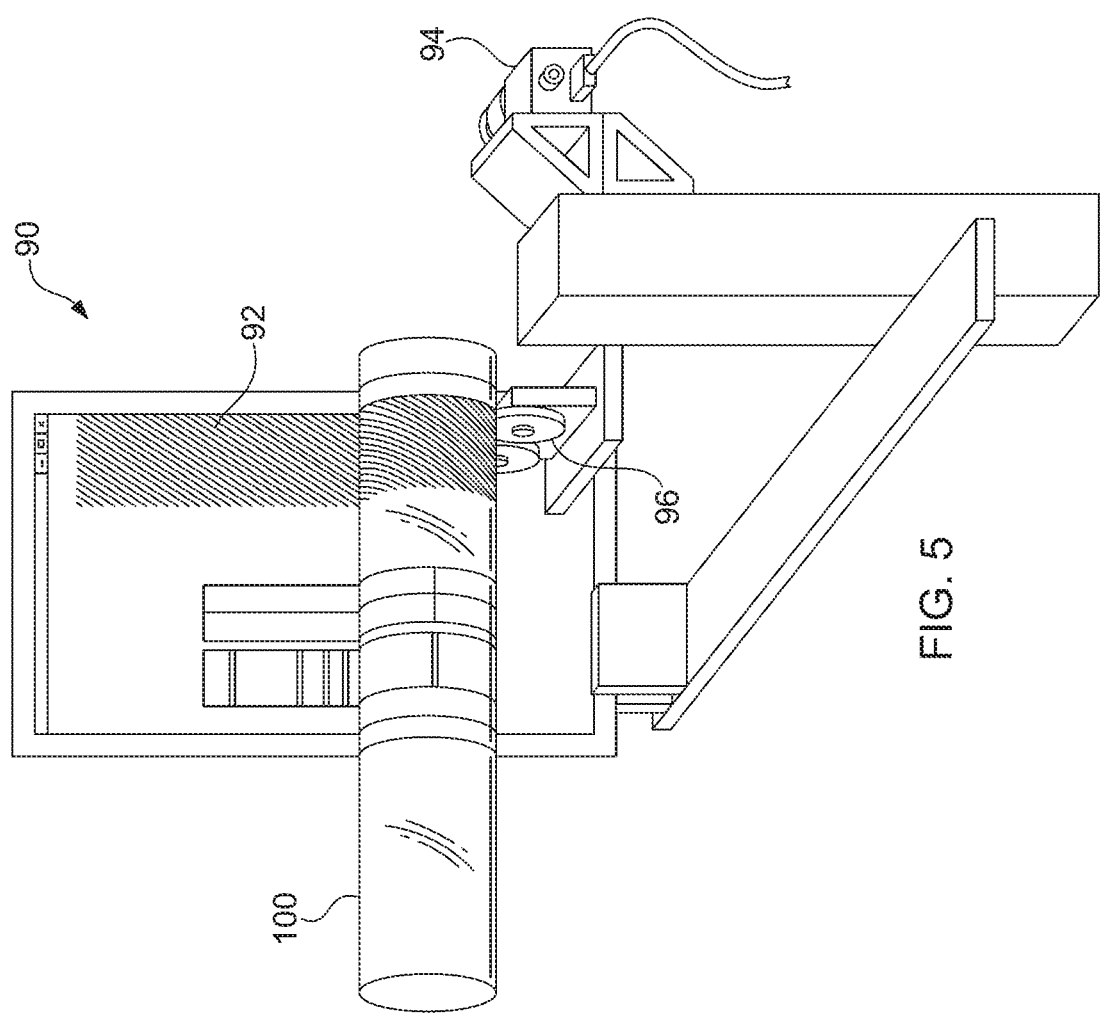

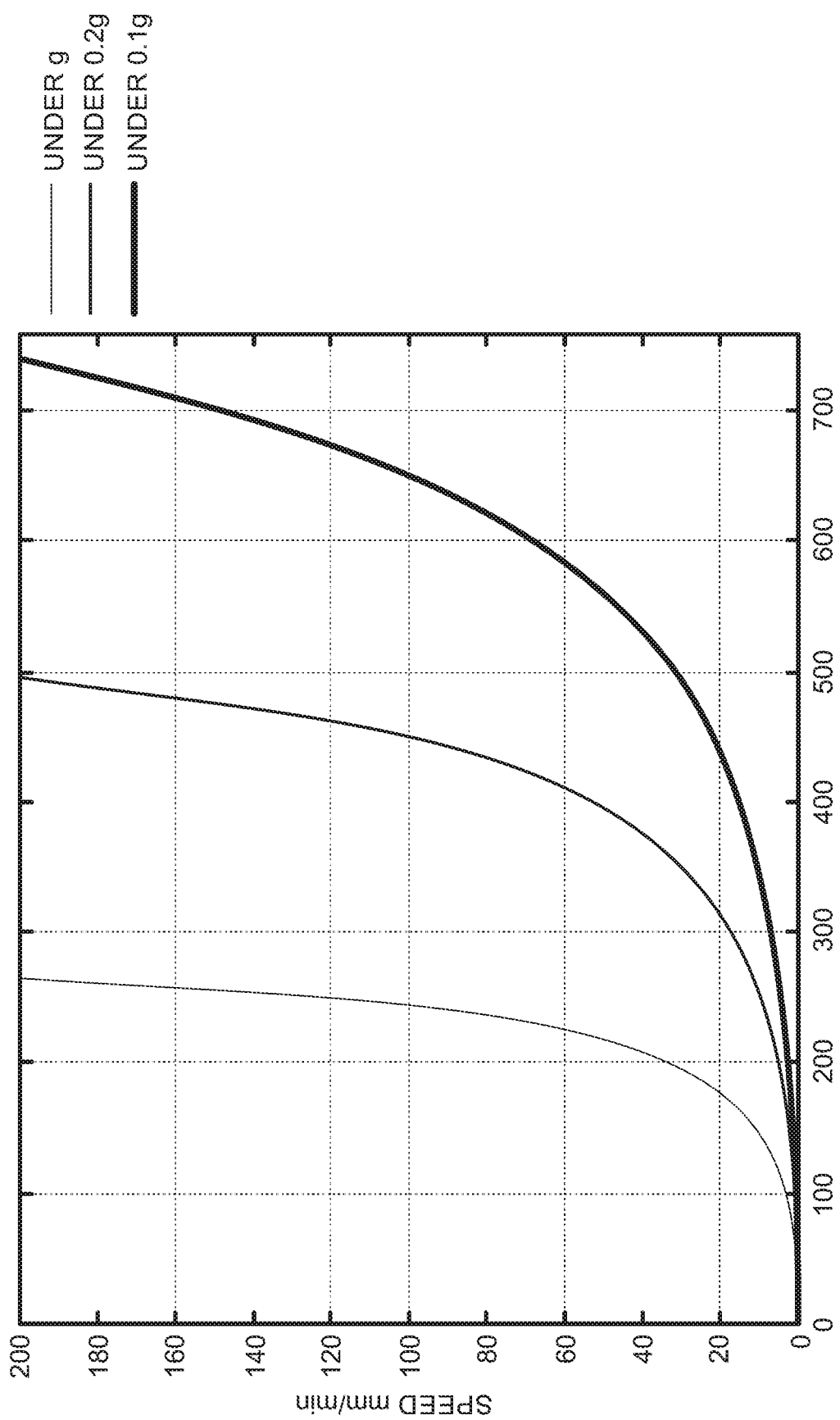

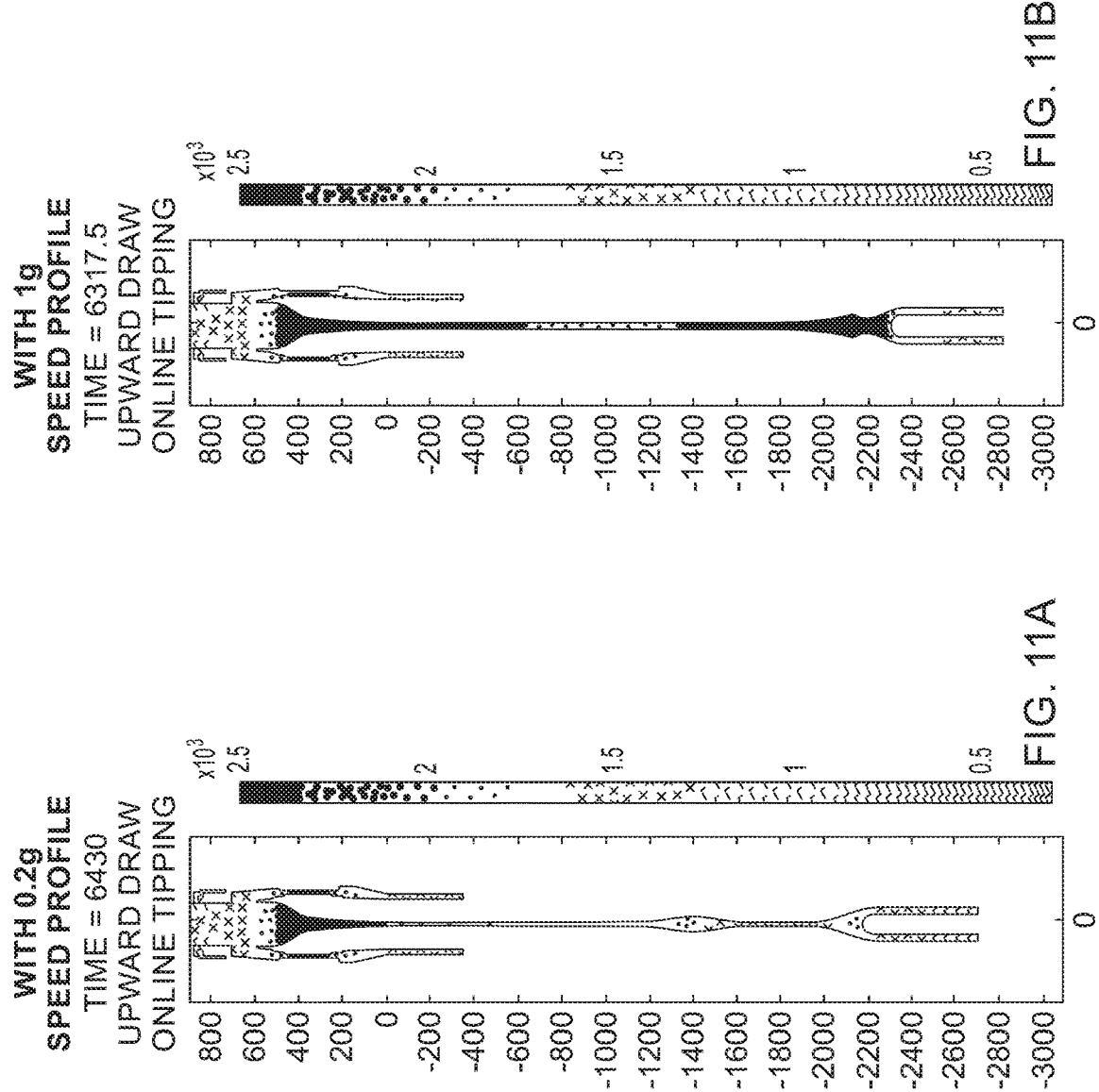

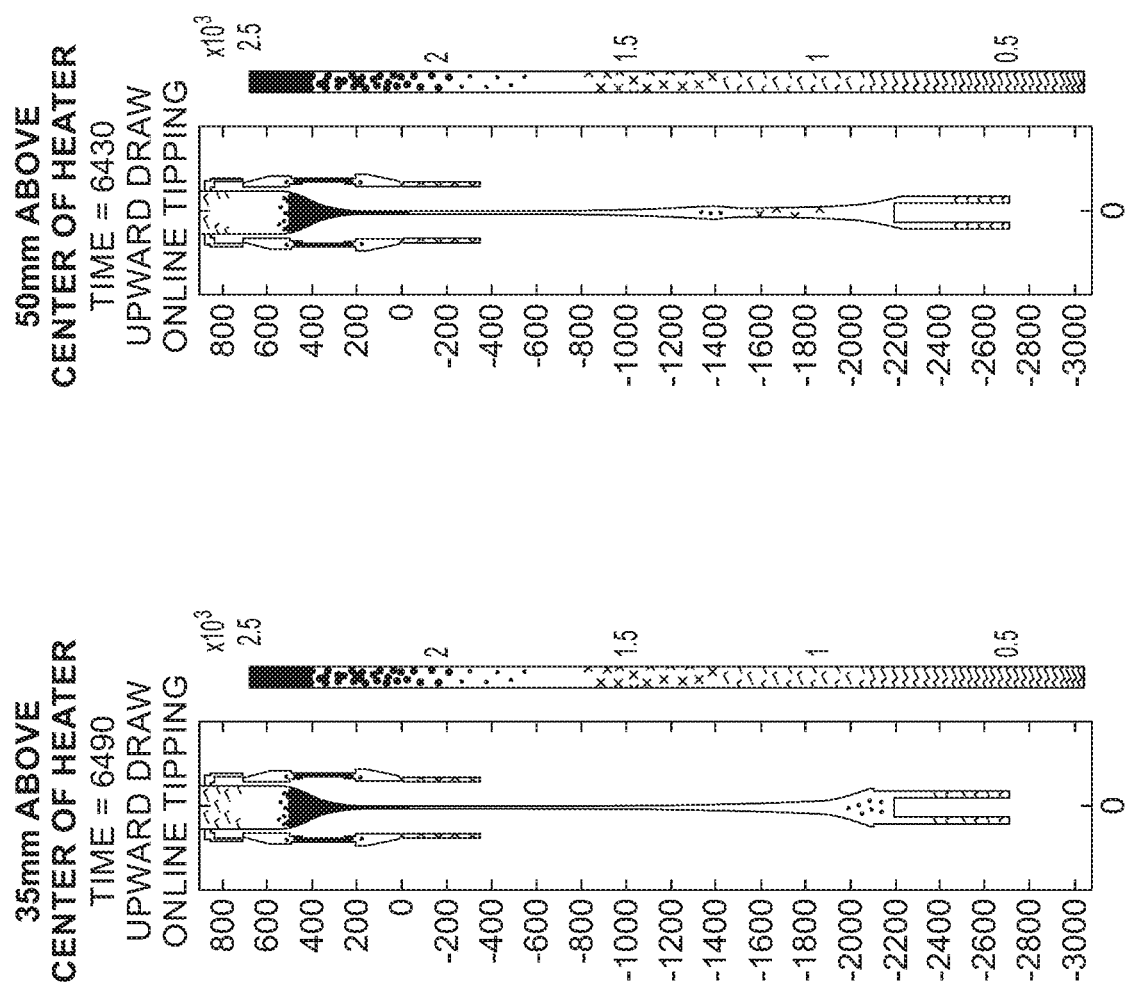

AUTOMATED LARGE OUTSIDE DIAMETER PREFORM TIPPING PROCESS AND RESULTING GLASS PREFORMS

CROSS-REFERENCE TO RELATED APPLICATION

This application claims the benefit of priority under 35 U.S.C. § 119(e) to earlier filed U.S. Provisional Patent Application No. 62/792,562 filed Jan. 15, 2019, the entire disclosure of which is incorporated by reference herein.

TECHNICAL FIELD

This application relates generally to producing elongated glass components and, more particularly, to using a process for making such components with excellent tip geometries and shapes, reduced glass waste, and minimal clad-to-core waveguide distortion.

BACKGROUND

As disclosed in U.S. Patent Application Publication No. 2018/0145752 titled "Upward Collapse Process and Apparatus for Making Glass Preforms" and filed on Nov. 15, 2017 by the assignees of the subject application, Heraeus Tenevo LLC & Heraeus Quarzglas GmbH & Co. KG, the field of applied science and engineering concerned with the design and application of optical fibers is known as fiber optics. An optical fiber is a flexible, transparent fiber made by drawing glass (silica) down to a diameter slightly thicker than that of a human hair. Optical fibers are used most often to transmit light between the two ends of the fiber and are used widely in fiber-optic communications, where they permit transmission over longer distances and at higher bandwidths (data rates) than wire cables. Fibers are used instead of metal wires because signals travel along fibers at high capacity with reduced loss. In addition, fibers are also immune to electromagnetic interference, a problem that plagues metal wires. Fibers are also used for illumination, and are wrapped in bundles so that they may be used to carry images, thus allowing viewing in confined spaces, as in the case of a fiberscope. Specially designed fibers are also used for a variety of other applications, such as fiber optic sensors and fiber lasers.

Optical fibers typically include a transparent core surrounded by a transparent cladding material with a lower index of refraction. Light is kept in the core by the phenomenon of total internal reflection which causes the fiber to act as a waveguide. Fibers that support many propagation paths or transverse modes are called multimode fibers; those that support a single mode are called single-mode fibers.

Today, tight optical fiber cutoff wavelength specifications must be met, and yield loss to achieve those specifications is not tolerated. Cutoff wavelength can be defined as the wavelength below which a single mode optical fiber will act as a multimode fiber. Or, in other words, cutoff wavelength can be defined as the wavelength above which single mode operation is ensured in a single mode optical fiber. Many network planners now realize that cable cutoff wavelength is one of the most important parameters to define while preparing an optical fiber cable specification.

An optical fiber is generally fabricated by heating a prefabricated preform inside a furnace and drawing the preform into the optical fiber. One preform might yield on the order of 7,000 to 8,000 km of optical fiber. It is desirable to efficiently and quickly start the fiber draw with a preform that has a sharp, short tip relative to the outside diameter of the preform. Furthermore, the preform tip should have an appropriate clad-to-core ratio so that the fiber drawn from it will have the correct fiber cutoff performance with minimum failure and waste.

SUMMARY

To solve the problems inherent in conventional downward draw systems and processes, a first object of an apparatus and related upward collapse process of using that apparatus for producing an optical fiber preform is to produce a preform that has a sharp, short tip relative to the outside diameter of the preform. A second object is to minimize, and perhaps eliminate, waveguide (clad-to-core) distortion effects in the final fiber drawn from such a preform so that fiber cutoff wavelength is correct. A third object is to minimize, and perhaps eliminate, the glass wastes in preform tipping and the assembly problems inherent in conventional downward draw systems and processes. A fourth object is to achieve the largest preform sizes with excellent geometry and waveguide properties for the highest productivity in subsequent fiber draw. A fifth object is to achieve the highest quality (cleanest and driest) RIT (Rod-in-Tube) or RIC (Rod-in-Cylinder) preform interface. A sixth object is to allow stacking of multiple free-standing core rods of arbitrary lengths inside the cylinder (without welding them together) so that their weight is fully and independently supported in the assembly to achieve nearly zero waste in the overclad process for the precious and expensive core rods and cylinders. Additional objects are to allow online tipping and to achieve nearly 100% finished preform yield.

A further object is to allow both floating positioning of the glass body used to make the preform in the horizontal (X-Y) plane and precision linear movement in the vertical (z) direction for exact alignment and control of preform geometry. A still further object is to monitor the behavior of the glass body during heating by one or more load cells. Yet a further object is to use physics and conservation of mass for precise dimensional controls of the preform draw and tipping process, eliminating the expense of conventional online measurements and feedback controls.

Another object is to use a reactive gas to etch, clean, and dry the preform interface. It is still another object to provide an inherently clean process that: (1) avoids direct contact with the preform outer surface, and (2) completely seals the preform assembly so its interface is shielded from the outside environment, particularly from the contaminants inside the heating element (e.g., furnace) of the apparatus during the vacuum initiation. A related object is to support the preform weight without contacting the outer surface of the preform. Other related objects are to avoid lateral or transverse forces on the preform during the manufacturing process, and to minimize or eliminate preform bow. Yet another object is to improve the quality of the preform or fiber interface by, for example, avoiding airlines, bubbles, fiber breaks, and loss problems.

It is also an object to use finite element modelling to develop efficiently the optimum upward draw and preform tipping recipe. A related object is to save precious furnace production capacity by reducing the number of trials necessary during development. Still another related object is to allow an exact understanding of the complex thermal physics of furnace heating and glass flow, particularly at the two ends of the preform where the final amounts of good preform and optical fiber yield can be "squeezed" out.

Still another object is to provide, in combination with the apparatus and related upward collapse process of using that apparatus for producing an optical fiber preform, a preform measurement capability with a camera system and a patterned background. A related object is to provide an automated, non-destructive, and production-friendly measurement of waveguide geometrical properties. Still another related object is to provide a value-added guarantee of waveguide quality for users of the preform and a potential opportunity to fine tune optical fiber draw.

To achieve the above objects, there is provided an apparatus and related upward collapse process of using that apparatus to make a glass preform with excellent tip geometries and shapes, reduced glass waste, and minimal clad-to-core waveguide distortion. The apparatus accepts a glass body having a weight, a circumference, and a core rod and a cladding ("cylinder") separated by a gap. The apparatus includes a top collar affixed to the top of the cladding, the top collar having an outside diameter approximately the same as or smaller than the outside diameter of the cladding; a bottom collar affixed to the bottom of the cladding, the bottom collar having an outside diameter either smaller than or approximately the same as the outside diameter of the cladding; one or more free-standing stacked core rods inside the cylinder supported by an optional spacer; a bottom collar holder and vacuum unit holding and supporting both the bottom collar and the optional spacer, thereby supporting the entire weight of the glass body without contacting the circumference of the glass body, the bottom collar holder and vacuum unit removing gas from or introducing gas to the apparatus; a top collar holder and vacuum unit holding and supporting the top collar, the top collar holder and vacuum unit removing gas from or introducing gas to the apparatus; and an overclad or draw tower structure or frame having a heating element and a defined heating zone to heat the glass body, collapse the cladding onto the core rod, close the gap, and create the glass preform.

The related upward collapse process creates a glass preform having minimum clad-to-core waveguide distortion. The process provides a glass body having a weight, a circumference, and a core rod and a cladding ("cylinder") separated by a gap. A top collar is affixed to the top of the cladding and a bottom collar is affixed to the bottom of the cladding. The bottom collar is supported with a bottom collar holder and vacuum unit located below a heating zone positioned in the draw tower. The free-standing stacked core rods (i.e., not welded together) are either supported from below by the bottom collar or by an optional spacer upon which the stacked core rods rest and which is supported by the bottom collar holder and vacuum unit, such that the bottom collar holder and vacuum unit supports the entire weight of the glass body without contacting the circumference of the glass body. The top collar is supported with a top collar holder and vacuum unit located above the heating zone. The glass body is positioned and moved upwards in a predetermined recipe with respect to the center of a heating element located in the heating zone. As the glass body is fed upward through the heating zone, the cladding collapses onto the core rod, thereby closing the gap and creating the glass preform.

An improved upward collapse process creates a glass preform that has a sharp, short tip relative to the outside diameter of the preform; reduced glass waste; and minimal clad-to-core waveguide distortion. A zone of the preform assembly is heated inside the furnace and softened. The preform tip is shaped and the process is controlled by the precise movement of the glass above and below the heat zone, the timing of the furnace heating, and the sensing of the weight of the lower (or alternatively of the upper) part of the preform, which in effect is a measure of the viscosity of the softened material. Once the correct viscosity is reached, the bottom holder is moved away from the top holder with an accelerated velocity profile (derived from the FEM simulation of glass flow) which is precisely programmed and controlled so that the preform tip is optimally shaped (usually short and sharp tipped) with minimum waveguide distortion (in the subsequently drawn optical fiber) and waste. The same concept of the highly non-linear, accelerated velocity pulling recipe can also be applied to other tipping processes such as the horizontal preform tipping process with butting lathe and oxy-hydrogen torch heating.

A related automated large outside diameter preform tipping process yields a glass preform having predetermined tip geometries and shapes, reduced glass waste, and minimal clad-to-core waveguide distortion in the subsequently drawn fiber. The process includes creating a glass preform in an apparatus having a heating zone, a first holding unit adapted to hold one end of the preform, and a second holding unit adapted to hold the opposite end of the preform; heating an area of the glass preform in the heating zone, thereby initially softening the preform in that area; adjusting the temperature of the heating zone; positioning the preform relative to the heating zone in a tipping position by moving the first and the second holding units simultaneously in a synchronized manner; changing the position of the first holding unit to transfer substantially all of the weight of the preform to the second holding unit; applying heat to the heating zone until the preform area softens; moving at least the second holding unit away from the heating zone along a predetermined non-linear velocity profile; once the velocity of the second holding unit achieves its maximum value, which creates a thinned glass strand in the area of the preform, at least reducing the temperature of the heating zone; and cutting the thinned glass strand to yield a tipped glass preform.

It is to be understood that both the foregoing general description and the following detailed description are exemplary, but are not restrictive, of the invention.

BRIEF DESCRIPTION OF DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 5 is a schematic view of an embodiment of a preform measurement device used in combination with the apparatus shown in FIG. 1.

FIGS. 11A, 11B, and 11C provide temperature profiles illustrating three different tipping speed profiles for an online bottom tipping process applied to a 200 mm OD preform;

FIGS. 15A, 15B, and 15C provide temperature profiles illustrating three different tipping positions for an online bottom tipping process applied to a 200 mm OD preform using a 0.2 g speed profile;

DETAILED DESCRIPTION

Figure 1:
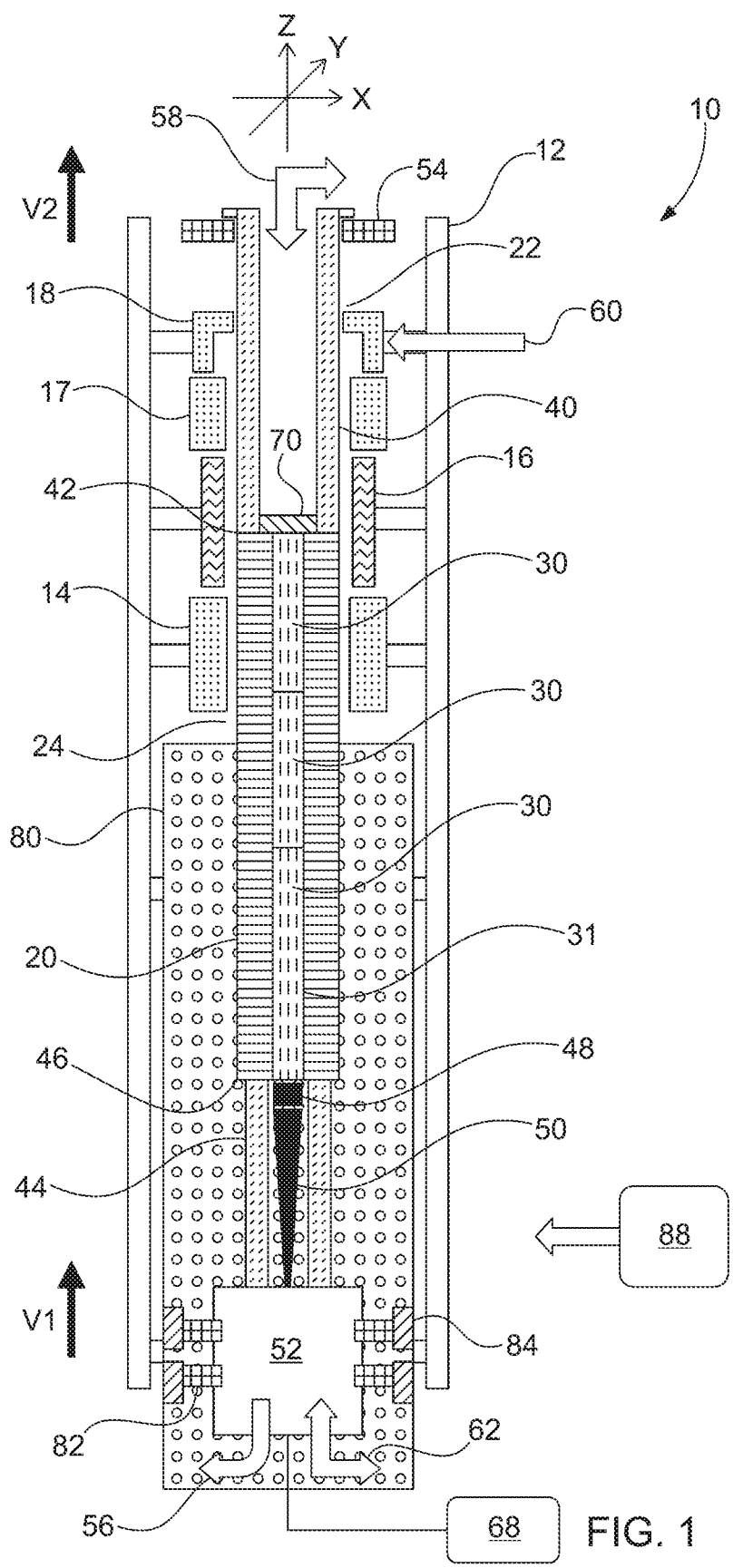
FIG. 1 is a schematic illustrating the main components of the apparatus used in the upward collapse process of forming an elongated component of glass.

An optical fiber is generally fabricated in two, separate processes. First, a core rod is prepared and then a preform is fabricated by a rod-in-tube (RIT) or rod-in-cylinder (RIC) process, or by another overclad process such as an outside vapor deposition (OVD) process. Second, the fabricated preform is heated inside a furnace and drawn into optical fiber. A conventional process and apparatus for producing the optical fiber preforms, completing the first of the two processes, may include the provision of an optical fiber RIT overclad apparatus.

The overclad apparatus includes a vertical lathe, a chuck installed in each end of the vertical lathe, a carriage in the vertical lathe for vertically moving between both ends of the vertical lathe, an oxygen-hydrogen burner installed in the carriage, a furnace installed in the carriage, a vacuum pump provided at an end of the vertical lathe, a coupler for connecting the vacuum pump to the end of the vertical lathe, and a controller outside the vertical lathe for controlling the vertical movement of the carriage, the flow rate of the oxygen-hydrogen burner, and the rotation of the chucks. The furnace preheats or heats a glass tube to overclad a core rod with the glass tube.

In practice, the outside diameter of the preform is limited to 90 mm or less in the conventional RIT overclad apparatus. That limitation is imposed by inefficient heating by the oxygen-hydrogen burner. Furthermore, a handle must be welded to a single core rod (of the same length as the RIT overclad tube) in order to provide a separate support for the core rod weight from the top end. This results in two disadvantages: (1) waste of core rod material because short core rods cannot be used effectively; and (2) welding of the handle to the core rod, especially with an oxygen-hydrogen torch, results in surface hydroxide (OH) incorporation on the surface of the core rod which if not etched away (an additional cost for the process) can increase fiber attenuation particularly at 1,383 nm due to OH absorption.

More recently, preforms for quartz glass tubing, rods, or collapsed offline rod-in-cylinders (ORICs) have been produced by introducing a quartz glass component (e.g., a cylinder, an ingot, or an uncollapsed RIC) into an apparatus including a heating zone (e.g., a furnace) in a vertical orientation such that the lower end begins to soften and form a strand. The strand is then placed in a pulling device including one or more sets of pulling wheels. The rate of draw of the strand is controlled by the speed of the pulling wheels, which may apply either a downward or an upward force depending on the forming zone temperature or viscosity and the weight of the strand supported by the wheels. Forming is accomplished without the aid of a die. Thus, the strand dimensions are controlled by the feed rate of the quartz glass component, the temperature of the heating zone, and the speed of the pulling wheels.

With the conventional ORIC process, a cylinder (typically 3 m long with an outside diameter of about 200 mm) made of synthetic, high-purity glass is collapsed onto a high-purity glass core rod to form an optical fiber preform with heat and vacuum at the interface gap. The preform is usually drawn downward continuously with a diameter significantly smaller than the original diameter of the cylinder. Sufficient vacuum must be applied to the gap between the cylinder and core rod to facilitate interface collapse as well as to support the weight of the core rod through the softened glass. Vacuum is essential to prevent core rod movement with respect to the cylinder; otherwise, the clad-to-core ratio of the resulting preforms will be distorted and fibers drawn from them will fail to meet the required waveguide specifications (such as the cutoff wavelength). Complicated and expensive preform outside diameter measurements and feedback controls are also needed in the downward collapse, stretch, and draw process and, even with such controls, it is difficult to achieve precise preform geometry (including low preform bow or curvature and diameter variation) and waveguide properties free of clad-to-core distortions. This inherent waveguide distortion effect in the downward draw process is in large part due to the gravitational and vacuum forces acting on the molten glass and the un-attached core rod in the furnace where the outer cladding glass, being hotter, flows downward faster than the inner core rod glass.

There is a significant difficulty in producing the largest preforms with outside diameters close to the original cylinder or cladding size with the conventional downward draw systems and processes. A significant amount of good preform glass is wasted at the start-up and at the end of the process where the geometry and waveguide properties of the preform are far from required specifications in terms of such parameters as geometry, clad-to-core ratio, core eccentricity and bow. Thus, the conventional preform systems and processes have distinct drawbacks.

According to U.S. Patent Application Publication No. 2018/0145752, an apparatus and upward collapse process are provided that yield a preform with the largest outside diameter and length known to exist (namely, an outside diameter of about 200 mm, where conventional outside diameters are limited to about 150 mm, and a length of about 3 m, or about the same size as the original cylinder or cladding) with almost no waveguide (clad-to-core) distortion and at significantly reduced waste and cost. Conventional optical fiber preforms have an outer diameter of 90 to 150 mm. In the streamlined upward collapse process, the stacked core rods in the ORIC cladding are supported from below (so the core rods do not move relative to the cladding in the collapse process) and the whole ORIC assembly moves up with respect to the furnace so the preform is continuously collapsed and drawn upward as illustrated in FIG. 1 and described below. The apparatus and upward collapse process: (1) produce the largest known preform because they can be made in a collapse-only process with the largest known overclad cylinder, (2) reduce cost because of nearly 100% overclad and finished (tipped) preform yield (nearly no waste) and a streamlined and simplified (e.g., no need for on-line measurement or feedback controls) process including an integrated online preform tipping process (a saving of processing time and a heating step), (3) improve waveguide quality because of the inherently low waveguide (clad-to-core) distortion with fixed, stacked, and supported core rods of variable and arbitrary lengths, and (4) allow reactive gas (such as $SF_6$) to be applied to the interface up to about one atmosphere (i.e., no need for vacuum) for improved interface and lower core rod D/d ratio (interface closer to the waveguide core).

The D/d ratio for the core rod is the ratio of the outside diameter of the core rod to the diameter of the waveguide core (where light propagates), where "D" is the outside diameter of the core rod and "d" is the diameter of the waveguide core. The ratio is very important to those who use RIT or RIC preforms to produce optical fibers in defining core capacity expansion. As the D/d ratio of the core rod decreases, the interface gets closer to the waveguide core and this means the relative amount of glass needed in the core rod decreases (while the amount of glass in the cladding needs to increase). This in turn means that with the same core rod manufacturing facility its capacity for making core rod (or equivalent capacity for optical fiber core) scales roughly as the square of D/d (e.g., a doubling of core capacity by reducing the D/d from 3.3 to 2.3). Reducing core rod D/d presents a significant challenge, however, to the overclad material purity and interface quality because of the exponentially increasing optical power propagation there. Thus, a more aggressive gas etching, cleaning, and drying process at the interface (with $SF_6$ for example) would be needed at lower core rod D/d. In short, a lower D/d ratio (i.e., the interface is closer to the core) allows manufacturers of the preform to (a) expand core capacity easily without expensive investment, and (b) realize more complex and advanced optical fiber designs with refractive index features closer to the core.

Referring to FIG. 1, there is shown an apparatus 10 for producing an optical fiber preform. The apparatus 10 includes a vertically arranged frame 12. From bottom to top, the frame 12 has a lower open end; a pre-heating or lower insulation zone 14; a heating zone 16; a post-heating or upper insulation zone 17; a post-heating cooling, annealing, and oven gas purging zone 18; and an upper open end opposing the lower open end. The heating zone 16 can preferably be heated to temperatures of 500° C. to 2,300° C., and more preferably 1,000° C. to 2,300° C., and still most preferably 1,500° C. to 2,300° C., by a heating element (typically an oven or furnace). More particularly, the heating element is preferably of an annular configuration. The heating element is preferably positioned within or around the frame 12 so as to form the heating zone 16 of the frame 12. An inert gas is injected into the heating element at a high temperature to prevent oxidation of the heating element.

Figure 2:
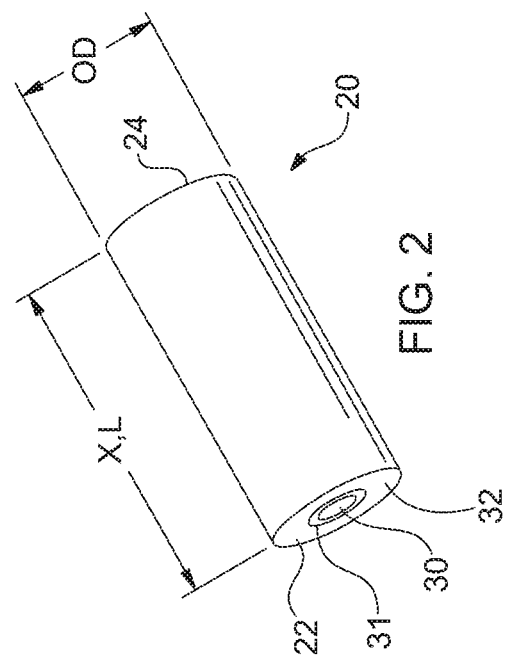
FIG. 2 is a perspective side view of a glass body used to produce an optical component.

Referring to FIG. 2, a glass body 20 is used to produce optical fiber preforms. The glass body 20 is of a cylindrical or tubular configuration. The glass body 20 has a length L which extends from a first or upper end 22 to an opposing second or lower end 24. A longitudinal axis X extends between the opposing first and second ends 22, 24. Preferably, both the first and second ends 22, 24 of the glass body 20 are square cut ends.

The glass body 20 is preferably comprised of a glass core or core rod 30 containing the waveguiding optical fiber core and a glass cladding 32 surrounding the core rod 30. More particularly, the core rod 30 is preferably formed in the geometric center of the glass body 20 and extends along the length L of the glass body 20. The cladding 32 is preferably formed over the core rod 30 to radially surround the core rod 30 along the length L of the glass body 20. The cladding 32 surrounds the core rod 30 in a coaxial arrangement aligned along a common center line. A gap 31 exists initially between the core rod 30 and the cladding 32. The cladding 32 has an outside diameter "OD."

The cladding 32 may be pure quartz glass or a doped quartz glass. Preferably, however, the cladding 32 is of the highest purity synthetic silica whether it is un-doped or doped (e.g. with Fluorine). The core rod 30 is preferably a mostly high purity quartz glass with doped and un-doped regions to achieve the appropriate refractive index profile. The cladding 32 and the core rod 30 may each be formed by any suitable process, such as fused quartz or one or more types of chemical vapor deposition (CVD), including inside vapor deposition, outside vapor deposition, and vapor axial deposition. The core material at the center the core rod 30 typically has a refractive index which is greater than the refractive index of the material in the surrounding cladding 32 to enable internal reflection of light signals passing through a fiber drawn from the preform, resulting in an effective waveguide.

Returning to FIG. 1, a first or top collar 40 is affixed to the top of the cladding 32. Although other mechanisms can be used to affix the top collar 40 to the cladding 32, a top weld 42 is suitable. The outside diameter of the top collar 40 is approximately the same as or smaller than the outside diameter of the cladding 32. A second or bottom collar 44 is affixed to the bottom of the cladding 32. Although other mechanisms can be used to affix the bottom collar 44 to the cladding 32, a bottom weld 46 is suitable. The outside diameter of the bottom collar 44 is either smaller than or approximately the same as the outside diameter of the cladding 32. The top collar 40 and the bottom collar 44 are both hollow, tube-like components.

The stacked core rods 30 are positioned inside the cladding 32 and rest on top of an optional short spacer 48 which, in turn, rests on top of a long spacer 50. The short spacer 48 is provided on top of the long spacer 50 to make sure the long spacer 50 is not welded to the preform after the upward collapse process and can then be removed easily from the bottom collar 44. The long spacer 50 is supported by a bottom collar holder and vacuum unit 52 located below the long spacer 50. The bottom collar holder and vacuum unit 52 also holds, as its name implies, and supports the bottom collar 44. The preform assembly (which includes the stacked core rods 30 and the cladding 32 of the glass body 20, along with the top collar 40 and the bottom collar 44 affixed to the cladding 32) and the bottom collar holder and vacuum unit 52 are loaded first onto a top collar holder and vacuum unit 54 located above the oven gas purging zone 18. (The bottom collar holder and vacuum unit 52 and the top collar holder and vacuum unit 54 allow the apparatus 10 to either remove gas from, i.e., create a vacuum, or introduce gas to the apparatus 10 at either end of the apparatus 10. The top collar holder and vacuum unit 54 holds, as its name implies, and supports the top collar 40.) Then the glass body 20 is positioned with respect to the heating zone 16 and, more particularly, to the heating element of the heating zone 16 and moved upwardly through the heating element. The bottom collar holder and vacuum unit 52 is gripped and supported below the heating zone 16; the top collar holder and vacuum unit 55 is gripped and supported above the heating zone 16. Before the heating step starts, the top weld 42 (and, therefore, the top of the cladding 32) is initially placed a predetermined distance below the center of the heating element to avoid thermal shock to the top weld 42. (By "predetermined" is meant determined beforehand, so that the predetermined characteristic must be determined, i.e., chosen or at least known, in advance of some event.) For example, this distance may be about 350 mm.

The upward collapse process of manufacturing a preform using the apparatus 10 is explained with reference to FIG. 1. The glass body 20 is passed through the frame 12, where it is heated, softened, and elongated to form an optical component, such as an optical fiber preform. More particularly, the lower end 24 of the glass body 20 is preferably positioned in a stable manner in the frame 12 at the start of the process and the glass body 20 then progresses in an upward (i.e., opposite the conventional downward) direction through the frame 12. In the frame 12, the glass body 20 is heated in a zone-wise manner in the heating zone 16. A preform is continuously created by melt deformation to collapse the overclad gap 31 and fuse the core rods 30 to the overclad cylinder or cladding 32 (and optionally the preform can be stretched/elongated or shortened/compressed by either pulling or compressing forces applied by the top collar holder and vacuum unit 54 and the bottom collar holder and vacuum unit 52 during the process).

In one embodiment, the glass body 20 is a coaxial assembly of two separate glass components: the stacked core rods 30 and the cladding 32. More particularly, the core rods 30 are in the form of a solid, cylindrical rod and the cladding 32 is in the form of a hollow overclad cylinder surrounding the stacked core rods 30 (i.e., a rod-in-cylinder assembly). In the coaxial assembly, the stacked core rods 30 and the cladding 32 are not fused together before the glass assembly enters the heating zone 16.

As the coaxial assembly of this embodiment of the glass body 20 progresses upward through the frame 12, the core rods 30 and the cladding 32 are heated to a predetermined temperature and time sufficient to cause the two glass components to soften and fuse together to form an integral and consolidated glass body 20. (By "integral" is meant a single piece or a single unitary part that is complete by itself without additional pieces, i.e., the part is of one monolithic piece formed as a unit with another part.) More particularly, as successive portions of the two-piece glass body 20 approach the heating zone 16 and are heated in the heating zone 16, the cladding 32 and the core rods 30 become softened and the softened cladding 32 collapses on and fuses with the core rods 30. At least one, and more preferably a plurality of "ready-to-draw" preforms may then be drawn directly into fiber from the resulting monolithic glass body 20.

Preferably, the coaxial arrangement of this embodiment of the glass body 20 is heated to temperatures of 500° C. to 2,300° C., and more preferably 1,000° C. to 2,300° C., and most preferably 1,500° C.-2,300° C. More preferably, softening and collapsing of the cladding 32 on the core rod 30 occurs at a temperature of 1,000° C. to 2,200° C., and more preferably 1,300° C. to 2,000° C., and most preferably 1,600° C. to 1,800° C. Fusing together of the softened and collapsed cladding 32 with the softened core rod 30 preferably occurs at a temperature of 1,000° C. to 2,200° C., and more preferably 1,300° C. to 2,200° C., and most preferably 1,600° C. to 2,200° C. Those skilled in the art will understand, however, that other factors, such as glass material composition and throughput also affect the temperature at which the cladding 32 will collapse on and fuse with the core rods 30.

The fused interface between the core rods 30 and the cladding 32 is assured to be clean by several components of the apparatus 10. For example, the bottom collar holder and vacuum unit 52 and the top collar holder and vacuum unit 54, which are both sealed, permit the upward collapse process to operate in a vacuum. The bottom collar holder and vacuum unit 52 and the top collar holder and vacuum unit 54 also isolate the preform assembly (particularly the interface) from potential contaminants in the heating element (e.g., furnace) and the outside environment. The furnace and the outside environment are typical sources of contamination for conventional processes, especially during the vacuum initiation process where the ingress of contaminants into the interface is difficult to avoid. In addition, a reactive interface treatment gas can be used to etch, clean, and dry the interface.

EXAMPLES

The following examples are included to more clearly demonstrate the overall nature of the invention. These examples are exemplary, not restrictive, of the invention.

FEM (finite element modelling) is used to develop process recipes via simulation that combine the motion of the cylinder and the heating rate of the oven to avoid thermal shock to the cylinder and culminate with the cylinder reaching temperatures required for collapse at the proper time. With the help of these simulations, as illustrated in FIGS. 3A, 3B, 3C, and 3D, recipes were identified to pre-heat the top of the cladding 32 and start the collapse of the interface between the cladding 32 and the core rods 30 (i.e., closing the gap 31 of the glass body 20) as a standard procedure. These four figures are snap shots of four typical moments in the simulation, which simply try to depict the preheating stage (A-B), the dwell time in the center of the heater, and the upward collapse in progress. The complete simulations show the progression of the temperature profiles during the whole, dynamic process. The snap shots illustrate some important moments in this process.

Figure 3A:
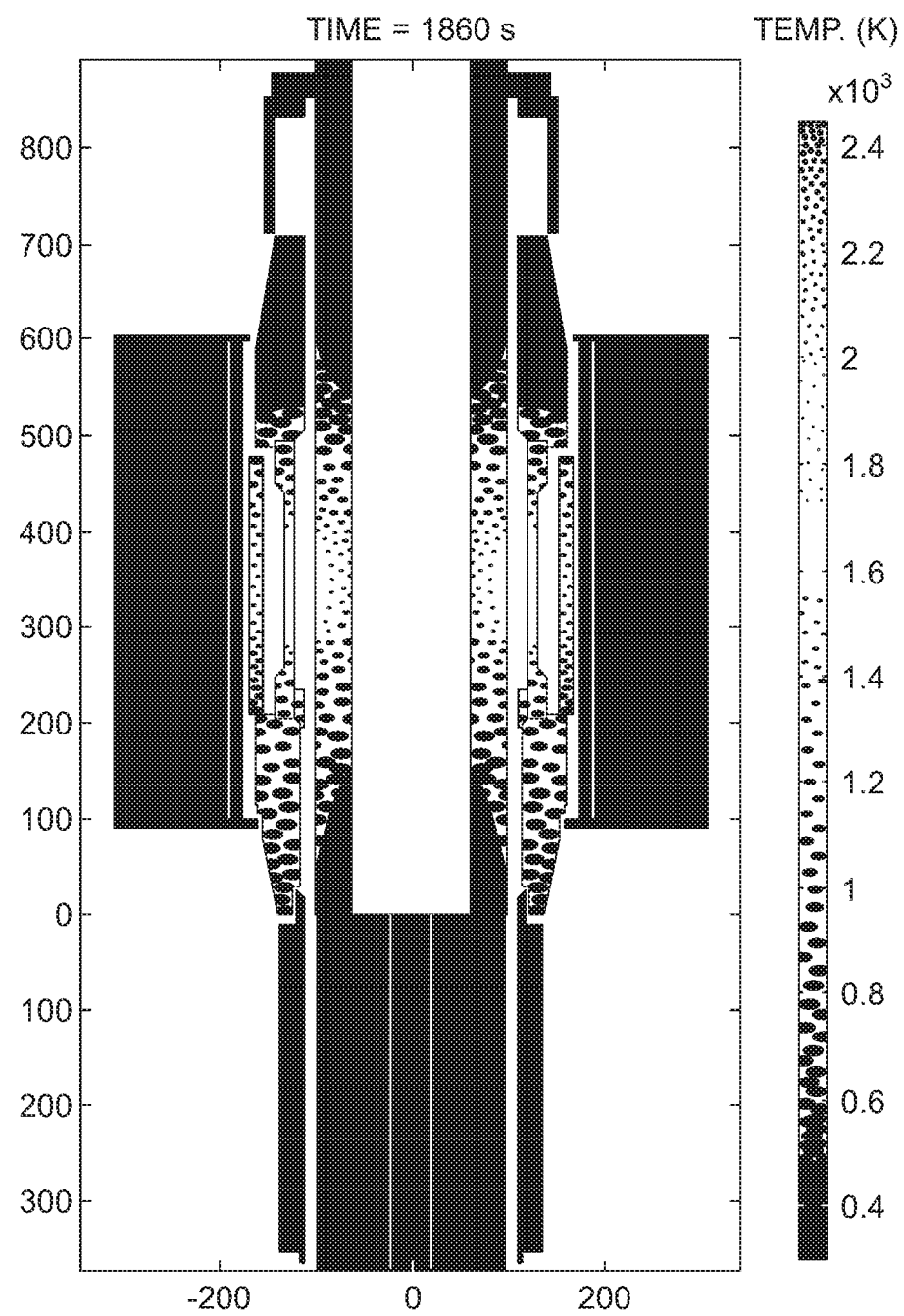
FIGS. 3A, 3B, 3C, and 3D illustrate four steps in a FEM simulation of the upward collapse process, depicting a glass body positioned in a heating element.
Figure 3B:
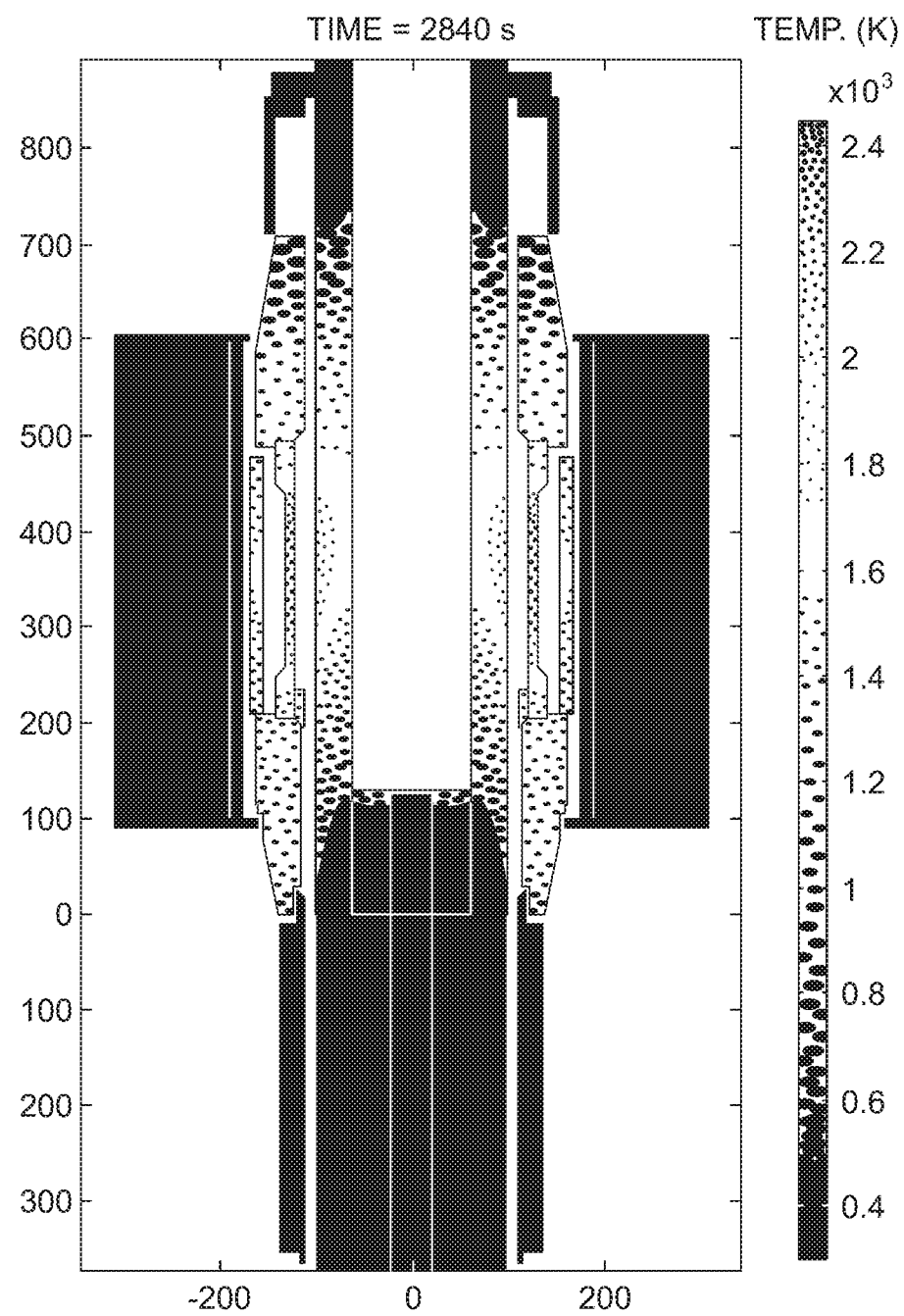
Figure 3C:
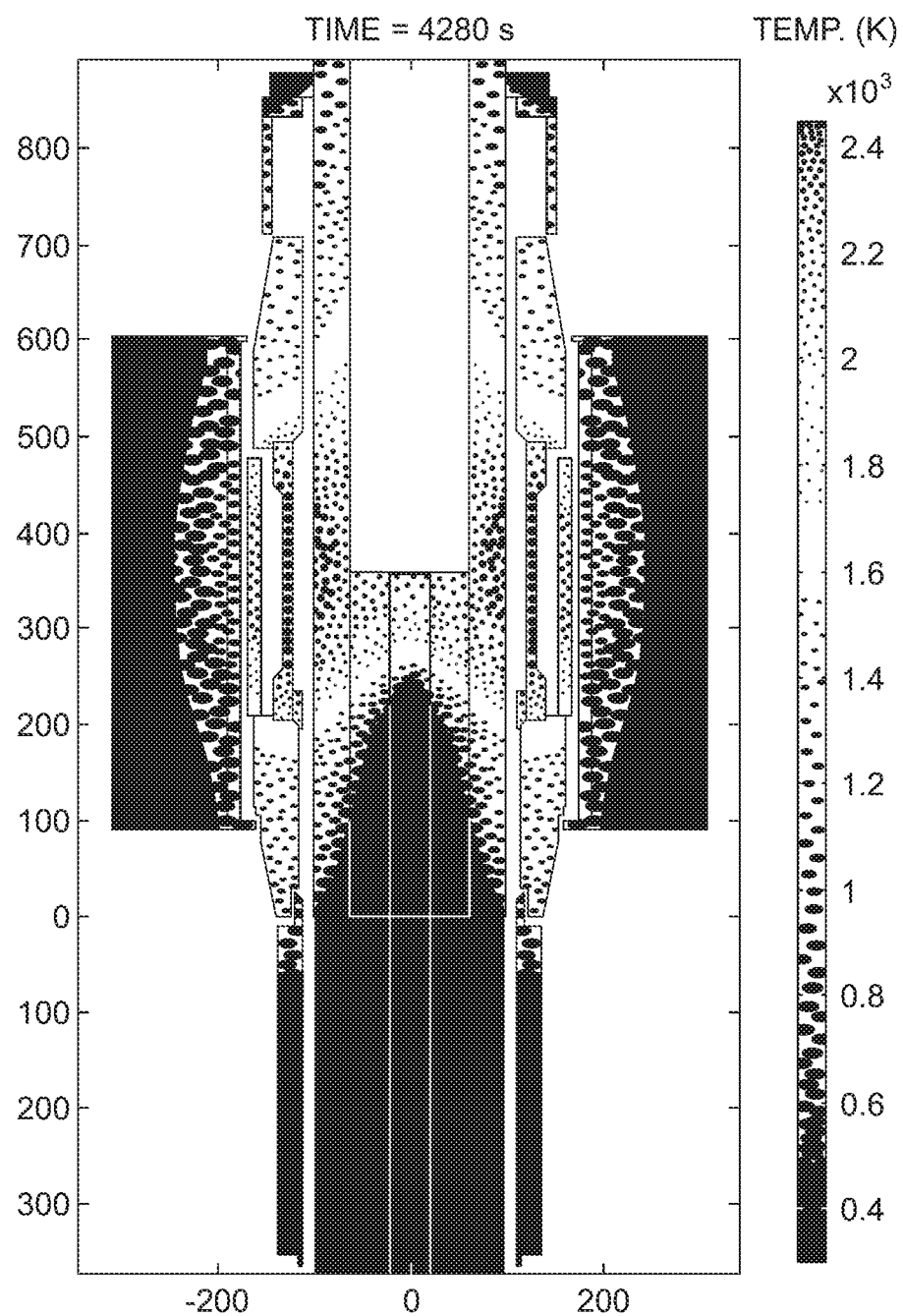
Figure 3D:
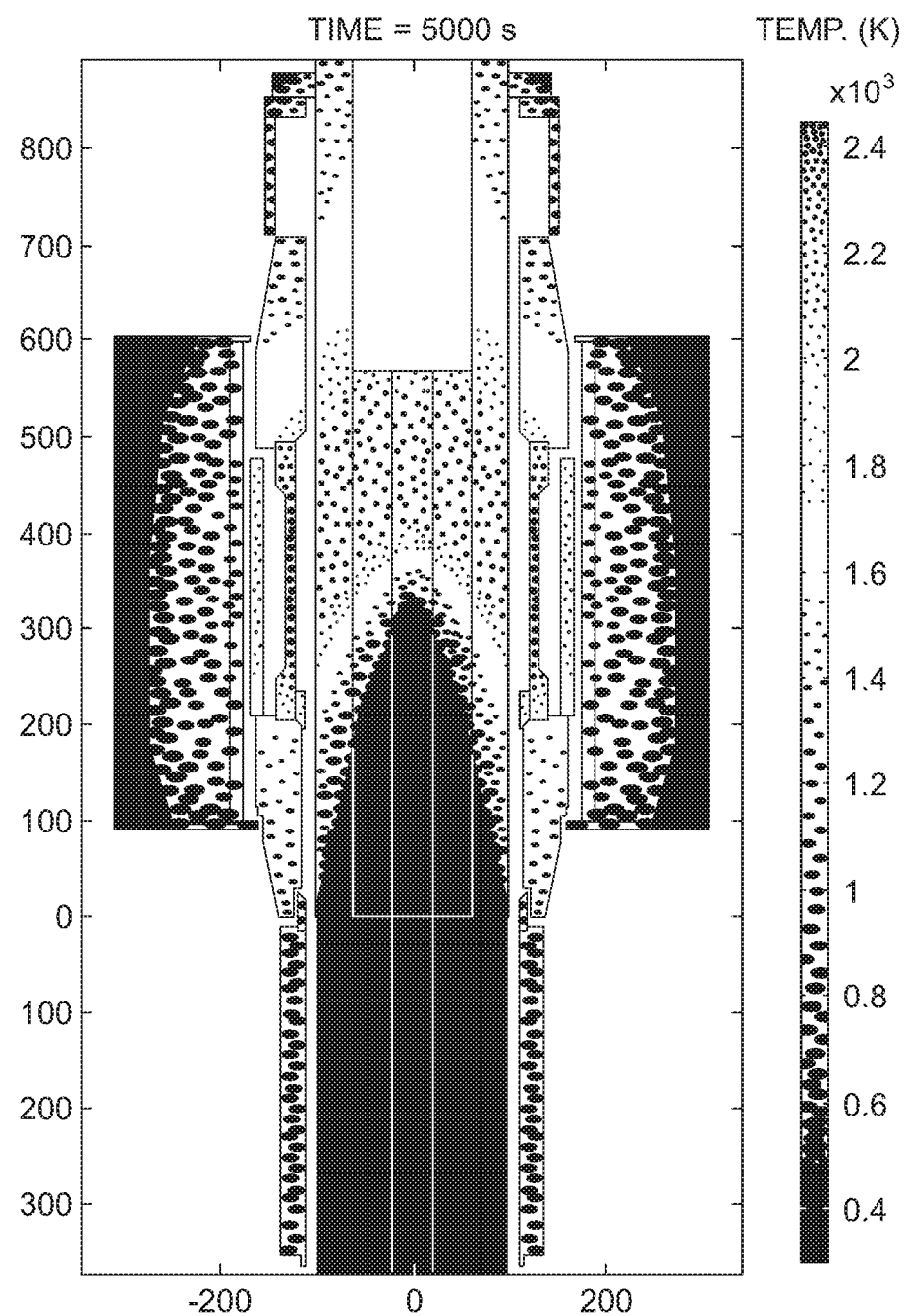

FIG. 3A shows the temperature profile of heating zone 16, glass body 20, and bottom collar 44 after the oven has been heating for 1,860 seconds, just before movement of the cylinder begins. FIG. 3B shows the temperature profile of the glass body 20 at 2,840 seconds into the process as the top of the glass body 20 reaches the bottom of the heating zone 16. FIG. 3C shows the temperature profile of the glass body 20 at 4,280 seconds into the process when the top of the glass body 20 has reached the center of the heating zone 16 and paused in its motion for seven minutes. FIG. 3D shows the temperature profile of the glass body 20 at 5,000 seconds into the process. The top of the glass body 20 has moved above the center of the heating zone 16. The glass body 20 and the core rods 30 reach the temperature required for collapse at approximately 100 mm above the center of the heating zone 16. FEM simulation provides information about the glass temperature, viscosity, stress, and flow inside the heating zone 16. FEM simulation was used to identify the recipes efficiently, for a heating zone 16 (and heating element) having a length of about 290 mm, which minimized the number of actual trials needed.

A typical recipe used to heat up the heating element of the heating zone 16 is 50 kW for 30 minutes, 100 kW for 10 minutes, 150 kW for 10 minutes, 200 kW for 10 minutes, 220 kW (or somewhat lower maximum power, for example 212 kW) into the steady-state of the process. The bottom collar holder and vacuum unit 52 located at the bottom of the apparatus 10 moves at a velocity V1, while the top collar holder and vacuum unit 54 located at the top of the apparatus 10 moves at a velocity V2. Typically, at the start of the process V1=V2. In a typical recipe, V1=V2=13.5 mm/minute for 6 minutes after 100 kW is reached for 2 minutes. Then the assembly is stopped for 4 minutes. After the 4 minute pause, the assembly moves up again at 13.5 mm/minute until the top weld 42 reaches the center of the heating element. Once the top weld 42 reaches the center of the heating element, the assembly is stopped for 6 minutes. Then the assembly is moved up again at V1=V2 for steady state collapse.

When the top weld 42 is about 110 mm to about 135 mm above the center of the heating zone 16, the vacuum pump of the bottom collar holder and vacuum unit 52 is activated (i.e., turned on). Such activation draws a vacuum in the direction of arrow 56 and causes the pressure in the top collar 40 to start decreasing. When the pressure in the top collar 40 stops decreasing, the top of the cladding 32 will have collapsed, the gap 31 will have closed, and the cladding 32 will have sealed or fused with the core rod 30. At this moment, the vacuum keeps pumping at the bottom collar holder and vacuum unit 52 while back filling gas (e.g., nitrogen gas $N_2$) to the top collar 40 until the pressure reaches about 1 atm. Then the top collar 40 is connected to air.

The vacuum pump of the top collar holder and vacuum unit 54 can be activated (i.e., turned on) to draw a vacuum in the direction of arrow 58. Similarly, a purging of the gas (typically an inert gas such as argon, helium, or, most typically, nitrogen) used in the heating element of the heating zone 16 can be achieved by introducing gas into the heating element in the direction of arrow 60. The gas purging occurs between the outer surface of the glass body 20 and the surface of the heating element, to prevent soot generation on the outer surface of the glass body 20 and oxidization of the heating element. The gas purging at the top of the heating element is typically on from the beginning of the process. It is important to identify a proper purging rate (9 $m^3$/h, for example) so that no soot or other deposits are formed on the surface of the preform during or after the process.

When the bottom weld 46 is a predetermined distance below the center of the heating zone 16 (for example, about 500 mm), the power of the heating element starts to decrease linearly. When the bottom weld 46 reaches the center of the heating zone 16, the power of the heating element should be at a predetermined ending power value (for example, about 150 kW to about 160 kW). While maintaining this ending power, the assembly should still keep moving up for a short distance (for example, about 50 mm). This process step suppresses the end phase temperature rise and avoids overheating and slumping of the glass near the bottom.

When the bottom weld 46 is a short distance above the center of the heating element (for example, about 50 mm), the process is complete. At this position, power to the heating element is turned off completely and assembly movement is stopped at the same time. The vacuum pumping can be maintained for a short period of time (for example, 1 to 2 minutes) after the process stops to guarantee the complete collapse of the cladding 32 to the lower end 24 of the glass body 20. Maintaining the vacuum is not necessary if the end phase heating recipe is 100% correct, however, and maintaining the vacuum for extra time may also carry the risk of deforming the bottom collar 44.

Figure 4A:
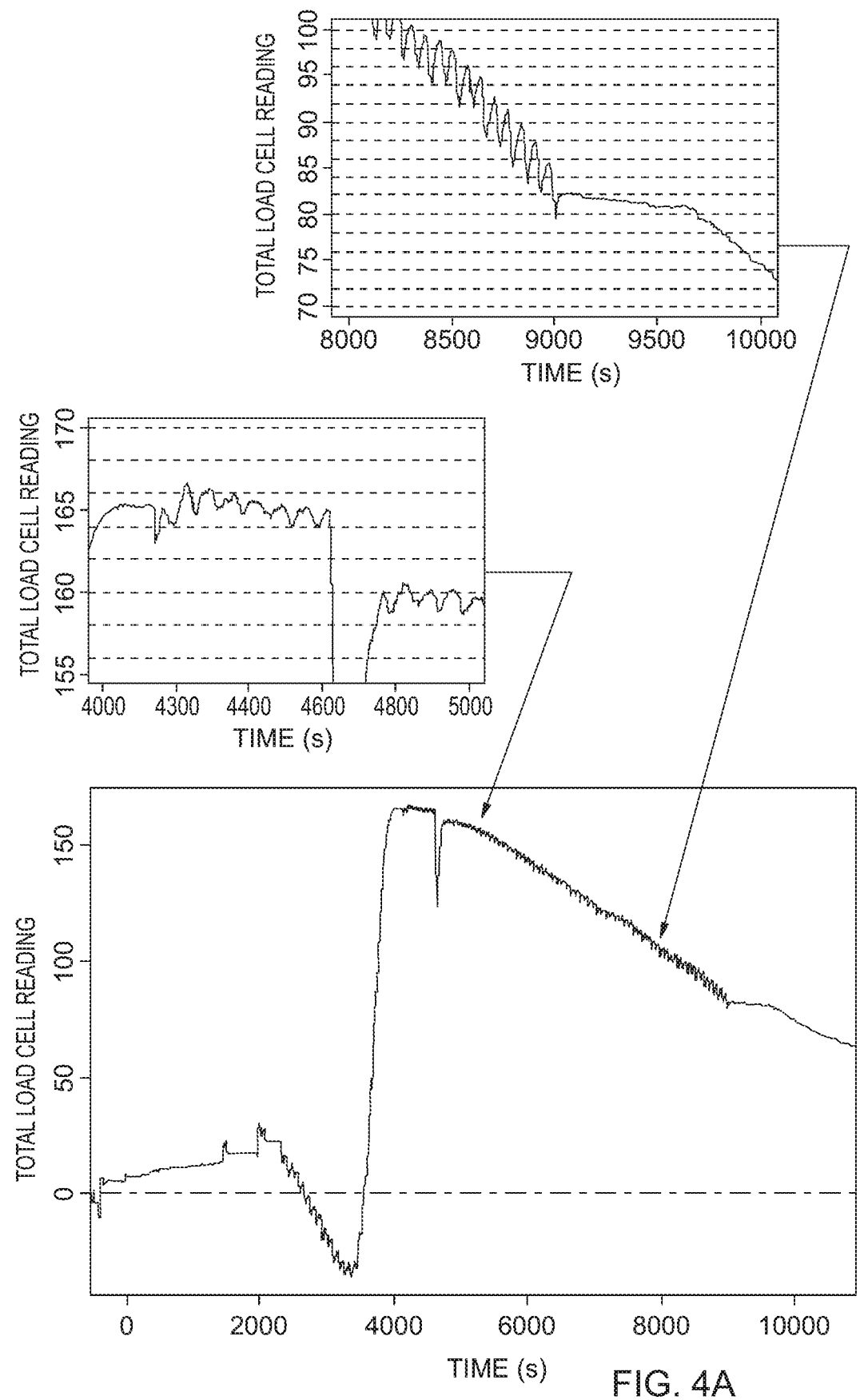
FIG. 4A illustrates load cell reading "ripples" reflecting a relatively large amplitude which indicates that the process run is on the cold side.
Figure 4B:
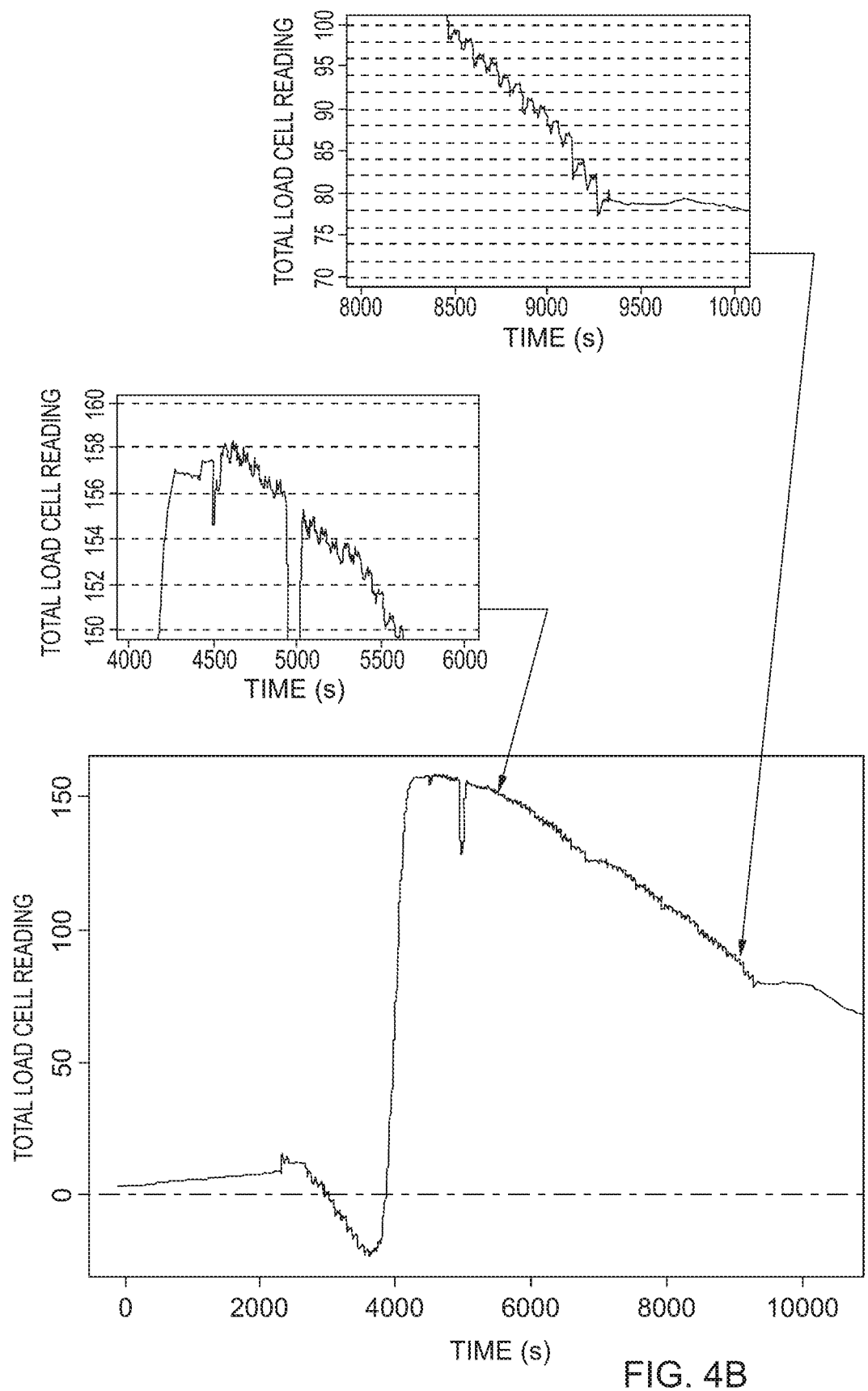
FIG. 4B illustrates load cell reading "ripples" reflecting a relatively small amplitude which indicates that the process run is on the hot side.

A load cell 68 was used to measure the total weight being supported by the bottom collar 44. It was discovered that if a slight constant oscillation perturbation is superimposed onto the velocity V2 of the top collar and vacuum unit 54 and the velocity V1 of the bottom collar holder and vacuum unit 52 is kept constant, "ripples" appear on the load cell reading curve as shown in FIGS. 4A and 4B. The bigger the amplitude of the "ripple," the colder the process. This is because with a colder process, the softened glass at the center of the heating element is more rigid and more able to translate the force of the oscillation to the bottom of the assembly. With constant heating element power settings, this information indicates whether the process is on the slightly hotter side or slightly colder side due to the actual condition of the heating element. For example, FIG. 4A illustrates a relatively large amplitude and, thus, a process on the cold side; FIG. 4B illustrates a relatively small amplitude and, thus, a process on the hot side. Based on this knowledge, one can determine the ending power of the process, i.e., the colder the process, the higher the ending power needs to be. This "ripple" amplitude is basically a true viscosity measurement of the glass body 20 at the center of the heating element, which is much more reliable than any glass surface temperature measurement with a pyrometer.

Thus, the apparatus 10 and related upward collapse process permit viscosity measurements of the glass body 20 at the center of the heating element by imposing an oscillating movement. A small oscillation is imposed onto the position at the top of the preform assembly. In parallel the weight of the preform assembly is measured by the load cell 68. The measurement of the load cell 68 provides an indirect measurement of the viscosity of the glass body 20 at the center of the heating element. This information can be used to control the temperature/heating power of the heating zone 16 using, for example, a controller 88 (discussed below).

As a distinct difference from the conventional downward draw processes, the stacked core rods 30 are supported by the spacer 48 or the bottom collar holder and vacuum unit 52 at the bottom of the stacked core rods 30 instead of being supported by a vacuum, essentially fixing the position of the core rods 30 with respect to the cladding 32 during the overclad and draw process. In other words, the upward collapse process does not require a vacuum to prevent core rod movement which can result in clad-to-core waveguide distortion and therefore a fiber cutoff wavelength problem. Furthermore, in contrast to the conventional downward draw process, the weight of glass both above and below the molten glass in the heating zone 16 is well supported by the top collar 40 and the bottom collar 44 in the upward draw process, which essentially eliminates the clad-to-core waveguide distorting effects conventionally caused in the heating zone 16 by gravitational and vacuum forces. This difference allows the upward collapse process to be much more tolerant when a heating element or collapse temperature runs on the cold side (because the glass does not have be softened sufficiently to translate a pressure difference from the vacuum and support the core rods 30).

The upward collapse process also allows a partial pressure in the gap 31 between the core rods 30 and cladding 32 (up to atmospheric pressure or a little more, typically about 1,100 mbar) because there is no need for vacuum to support the weight of the core rods 30. Therefore, a reactive interface treatment gas such as sulfur hexaflouride ($SF_6$, which is safe to handle at room temperature) can be freely applied during the high-temperature collapse in the direction of interface treatment gas arrow 62 to etch away any potential interface contamination such as metallic particles or surface hydroxide (OH). In addition to sulfur hexaflouride, other suitable reactive interface treatment gases include oxygen ($O_2$), chlorine ($Cl_2$) although safety concerns would arise, fluorine ($F_2$), nitrogen trifluoride (NF), silicon tetrafluoride ($SiF_4$), carbon tetrafluoride ($CF_4$), and fluoroform ($CHF_3$). Use of a reactive interface treatment gas to etch, clean, and dry the preform interface yields an improved interface, an enhanced optical fiber quality (reduced fiber breaks, bubbles, loss, or airlines), and a lower core rod D/d ratio.

As mentioned in the previous paragraph, the upward collapse process is much less vulnerable to differential core-clad glass flow or waveguide distortion effects because the stacked core rods 30 are supported from below by the spacer 48 or the bottom collar holder and vacuum unit 52 and the weight of the glass both above and below the heating zone 16 (where the glass is softened) is also supported. Such support eliminates the problem of uncontrolled glass flow and distortion. Therefore, there is a natural advantage of processing low viscosity glass material (such as heavily F-doped cladding 32) without risking clad-to-core waveguide distortion from excess heating or from gravitational and vacuum forces. This provides an important processing advantage for a certain class of fiber designs with F-doped cladding 32 materials.

Returning to FIG. 1, an optional glass disk 70 with an outside diameter slightly smaller (i.e., typically about 126 mm) than the inside diameter of the top collar 40 is placed on top of the core rods 30 and the cladding 32 and inside the top collar 40. The disk 70 may be about 5 cm thick. During the start-up of the process, after the 6 minutes dwell time of the top weld 42 at the center of the heating element, a vacuum is applied from both the bottom collar holder and vacuum unit 52 and the top collar holder and vacuum unit 54. The vacuum collapses the top collar 40 onto the disk 70. By setting V2>V1, a tip is pulled on top of the cladding 32 before the steady-state collapse of the rest of the cladding 32 where V2=V1. The result is a low-cost and high-yield online preform tipping process, which yields preforms that are easiest and most efficient for subsequent fiber draw. The integrated online preform tipping process saves substantial amounts of both effort and cost (e.g., saves an extra heating step) over the conventional offline tipping process.

If V2 is set to be higher than V1 when the interface collapse has been initiated and continues, the upward collapse process can also stretch or draw upward a preform with a diameter significantly smaller than the original diameter of the cladding 32. The diameter of the stretched (or even compressed) preform can be accurately controlled by the precise settings of linear vertical speeds V1 and V2 through the law of conservation of mass. The start-up loss of good preform glass is much less for the upward collapse process, however, than for the conventional downward draw process and it can therefore result in a significant cost saving for the stretched preforms.

The upward collapse process is also a completely contact-free process for the finished preform because the weight of glass both above and below the heating zone 16 (where the glass is softened) is supported by the top collar 40 and the bottom collar 44 while the outer surface of the preform itself is untouched. Avoidance of preform contact and therefore any lateral or transverse force results in both a very clean preform surface and a straight preform with very little bow, unlike in the conventional downward draw process where puller wheels are always in contact with, and apply lateral or transverse force to, the preform throughout the process.

In many conventional downward draw processes, small contact areas exist between the puller wheels and the preform circumference. Such contact can introduce impurities or contaminants on the preform surface. In addition, puller wheels can assert lateral force in the downward draw process causing preform bow (which becomes exacerbated for longer preforms, i.e., bow increases as the square of the preform length for the simple curvature case). The amount of contact force that can be applied to the preform by the puller wheels is limited because excessive pressure can damage the glass surface of the preform. Therefore, for large preforms that require a greater pulling force than can be applied by a single set of puller wheels, multiple sets of puller wheels may be applied to the preform at different levels to achieve the necessary total vertical (frictional) force to support preform weight. But multiple sets of puller wheels increase both apparatus height and cost. Further, low bow in the preform can only be achieved with multiple sets of puller wheels if the sets of puller wheels are precisely aligned, which is difficult to achieve in practice. The contact-free upward collapse process yields a preform with very little bow due to the lack of any lateral forces applied to the preform.

Returning again to FIG. 1, the apparatus 10 may optionally include a gripper system 80 attached to the frame 12. A suitable gripper system 80 is described more fully in International Patent Application No. PCT/US2015/012471, titled "Formation Of Elongated Glass Components With Low Bow Using A Gripper Device" and filed on Jan. 22, 2015 by the assignees of the subject application, Heraeus Tenevo LLC & Heraeus Quarzglas GmbH & Co. KG. In one embodiment, the gripper system 80 is included with the apparatus 10 by attaching the gripper system 10 to the frame 12.

The gripper system 80 includes clamping elements 82 and mounting elements 84 attaching the clamping elements 82 to the gripper system 80. The gripper system 80 may move vertically parallel to the length of the frame 12 (defined in FIG. 1 as the Z direction). The mounting elements 84 allow translational movement of the clamping elements 82 in the X direction and the Y direction (i.e., to any position within the X-Y plane). (Although neither necessary nor preferred, a chuck system may also be used that allows rotation—especially if a torch, rather than a furnace, were to provide the heating element.) In one embodiment, the mounting elements 84 are X-Y tables including a pair of arms mounted on linear bearings or linear rails and a motor, for example a manual or servo motor drive, to control movement of the arms. The mounting elements 84 are further low-friction devices, so that a force applied to the clamping elements 82 by an external object will result in the clamping elements 82 being deflected along the mounting elements 84 rather than the clamping elements 82 applying a resistive force to the external object.

Once the preform has formed, the gripper system 80 may be attached by moving the clamping elements 82 into contact with the bottom collar 44 or (as shown in FIG. 1) the bottom collar holder and vacuum unit 52. The clamping elements 82 preferably should not contact the preform. The clamping elements 82 may be sized to have convex regions having the opposite shape of the bottom collar 44, so that the clamping elements 82 fit securely around the bottom collar 44 without causing damage to the bottom collar 44. The clamping elements 82 may contact all or (as shown in FIG. 1) only a portion of the outside surface of the bottom collar 44 or the bottom collar holder and vacuum unit 52. In an exemplary embodiment, the clamping elements 82 may be made of a high temperature compressible material such as calcium silicate, asbestos, compressed glass, or ceramic fibers (e.g., rock wool) or high temperature rubber (e.g., silicone or fluoropolymer elastomers).

The clamping elements 82 are first aligned with the center of the bottom collar 44 or the bottom collar holder and vacuum unit 52 by determining the center of the bottom collar 44 or the bottom collar holder and vacuum unit 52 and then moving the clamping elements 82 into alignment with the center in the X direction. In some embodiments, the clamping elements 82 may be aligned to an estimated center of the bottom collar 44 or the bottom collar holder and vacuum unit 52, for example the expected center based on the desired travel path. In other embodiments, in order to more accurately align the clamping elements 82 with the bottom collar 44 or the bottom collar holder and vacuum unit 52, the apparatus 10 may further include a sensing element capable of locating the center of the bottom collar 44 or the bottom collar holder and vacuum unit 52 and a computer for determining the center from the output of the sensing element. The sensing element may include one or more laser devices, a camera/vision system, a linear encoder, or a mechanical contact (dial indicator) system. In an exemplary embodiment, the sensing element may be attached to the gripper system 80 or may be external to the gripper system 80, for example attached to the frame 12. In another embodiment, the sensing element may be external to both the gripper system 80 and the frame 12, for example cameras. Because the gripper system 80 includes further elements to prevent misalignment, it is not necessary for the gripper system 80 to perfectly align with the center of the bottom collar 44 or the bottom collar holder and vacuum unit 52.

Once the clamping elements 82 are aligned, the clamping elements 82 are brought into contact with the bottom collar 44 or the bottom collar holder and vacuum unit 52 by movement of the mounting elements 84 in the X direction. The mounting elements 84 may be moved by any suitable mechanism, for example a motor used to control the pair of arms of an X-Y table. Because the mounting elements 84 are low-friction devices, if the clamping elements 82 attempt to attach to the bottom collar 44 or the bottom collar holder and vacuum unit 52 while not properly aligned with the center, the force of the bottom collar 44 or the bottom collar holder and vacuum unit 52 pushing against the clamping elements 82 will move the clamping elements 82 into an aligned position instead of the bottom collar 44 or the bottom collar holder and vacuum unit 52 being moved. The mounting elements 84 may further include a locking mechanism that may be engaged and disengaged to prevent movement of the clamping elements 82 once the clamping elements 82 are attached to the bottom collar 44 or the bottom collar holder and vacuum unit 52. While the clamping elements 82 are being moved into position, the locking mechanism is unlocked, so that the clamping elements 82 may be moved by the motor while still being displaced by any additional force applied to the clamping elements 82. Once the clamping elements 84 are in contact with the bottom collar 44 or the bottom collar holder and vacuum unit 52, the locking mechanism is engaged to prevent further movement of the clamping elements 82 in the X-Y plane.

To detect misalignment, in one embodiment the gripper system 80 further includes a force sensing device, such as load cells, to sense reaction forces to measure the reaction force that occurs during the process of the clamping elements 82 attaching to the bottom collar 44 or the bottom collar holder and vacuum unit 52. Load cells are transducers that convert a force applied to the clamping elements 82 to a strain gauge (not shown) of each load cell into an electrical signal. The electrical signal may then be measured and correlated to the force applied to the strain gauge. Exemplary load cells include hydraulic load cells, pneumatic load cells, and strain gauge load cells. Should the clamping elements 82 not be properly aligned with the center of the bottom collar 44 or the bottom collar holder and vacuum unit 52, the reaction force will be greater than if the clamping elements 82 are properly aligned. By measuring the reaction force with the force sensing device, misalignment may be detected and corrected before the clamping elements 82 apply a force to the bottom collar 44 or the bottom collar holder and vacuum unit 52 sufficient to result in movement of the bottom collar 44 or the bottom collar holder and vacuum unit 52. In one embodiment, the force sensing device may be used in conjunction with the low-friction mounting elements 84, where the speed at which the clamping elements 82 are attached to the bottom collar 44 or the bottom collar holder and vacuum unit 52 is slowed in response to a greater-than-expected reaction force in order to allow the clamping elements 82 to move on the mounting elements 84 into an aligned position. In an exemplary embodiment, the clamping elements 82 may be moved toward the bottom collar 44 or the bottom collar holder and vacuum unit 52 at a rate ranging from approximately 50 mm/minute to approximately 100 mm/minute while no misalignment is detected by the force sensing device, and the rate reduced to approximately 10 mm/minute to approximately 25 mm/minute if misalignment is detected. In other applications, the clamping speeds may exceed these ranges.

In summary, the gripper system 80 helps to support the preform assembly weight (which may be about 350 kg or more), replacing the conventional full-contact puller wheel system. The gripper system 80 permits floating positioning of the glass body 20 used to make the preform in the horizontal (X-Y) plane and precision linear movement in the vertical (Z) direction for exact alignment and control of preform geometry and preform tipping process. Especially when the gripper system 80 is incorporated, the apparatus 10 avoids lateral or transverse forces on the preform, thereby minimizing and perhaps eliminating preform bow; can monitor glass behavior during heating using a load cell; and permits the use of physics (conservation of mass) to control dimensions precisely (eliminating the expense of conventional online measurements and feedback controls).

In addition, the apparatus 10 and related upward collapse process can be used in combination with a preform measurement device. A suitable preform measurement device is described more fully in International Patent Application No. PCT/US2014/050368, titled "Methods And Apparatus For Determining Geometric Properties Of Optical Fiber Preforms" and filed on Aug. 8, 2014 by the assignees of the subject application, Heraeus Tenevo LLC & Heraeus Quarzglas GmbH & Co. KG.

FIG. 5 is a schematic view of an embodiment of the suitable preform measurement device 90 for determining one or more geometric properties of an optical fiber preform 100. Referring to FIG. 5, the device 90 includes a two-dimensional pattern 92 and an image capturing unit 94. In the embodiment depicted in FIG. 5, the image capturing unit is a digital camera. The preform measurement device 90 shown in the embodiment depicted in FIG. 5 includes a support and driver 96 configured to rotate the optical fiber preform 100 about its longitudinal axis. The portion of the support and driver 96 shown in FIG. 5, positioning the right end of the optical fiber preform 100, also includes the support and driver 96 configured to rotate the preform 100. The support and driver 96 may be a unitary structure or the support and the driver may be separate components. The support is structured to align the preform 100 between the two-dimensional pattern 92 and the image capturing unit 94 such that the images captured are of the two-dimensional pattern 92 as viewed through the preform 100.

One exemplary method of using the preform measurement device 90 includes the following steps: providing an optical fiber preform 100 having a longitudinal axis, an outer diameter and a circumference; providing a two-dimensional pattern 92 having a length parallel to the longitudinal axis of the preform 100 and a width greater than the outer diameter of the preform 100; providing an image capturing unit 94 disposed such that the preform 100 is aligned between the two-dimensional pattern 92 and the image capturing unit 94; rotating the preform 100 about its longitudinal axis and acquiring a first plurality of images of the two-dimensional pattern 92 viewed through the preform 100 at two or more different points along the circumference of the preform 100; and determining at least one geometric property of the preform 100 from the first plurality of images.

Geometric characteristics or properties of the optical fiber preform 100 that can be determined in accordance with the preform measurement device 90 and related method include the diameters, ovalities, D/d ratio, overclad OD/ID ratio, eccentricities of the core rods 30 and core eccentricities of the finished preform 100, as well as overall preform bow. Thus, the preform measurement device 90 and related method provide an automated, non-destructive, and production-friendly measurement of waveguide and geometrical properties. They also provides a value-added guarantee of waveguide quality for users of the preform 100 and a potential opportunity to fine tune the process of creating the optical fiber.

A controller is a hardware device or a software program that manages or directs the flow of data (i.e., facilitates communication) between two components. The apparatus 10 includes a controller 88. The controller 88 provides the ability to obtain data from, for example, the load cell 68, the gripper system 80; the top and bottom collar holder and vacuum units 52, 54; and the vacuum and treatment gas systems, and to use that data to control the other components of the apparatus 10 and the related upward collapse process. The controller 88 has programmed in it, in a manner well-known to those skilled in the art, a preset control program or routine to assure efficiently the optimum heating and movement process recipe. More specifically, the controller 88 can define, for example, the velocities V1 and V2, the flow rates of gases, the positions of the grippers and feeder, the timing of the power settings of the furnace, and the pressure of the vacuum pumps. The controller 88 helps to assure a robust and reproducible "one button" automated process for production.

An important advantage of the upward collapse process is minimization, perhaps elimination, of waveguide (clad-to-core) distortion. Sources of waveguide distortion are the gravitational and vacuum forces on the core rod and molten glass inherent in conventional processes and eliminated by the upward collapse process. Waveguide distortion is a problem that is rarely, if ever, addressed in the RIT/RIC field. The lack of problem recognition may be because past optical fiber performance requirements were much less stringent, so the field tended to treat optical preforms just like a simple glass rod without worrying about the actual waveguide (clad-to-core) distortion effect which can result, for example and among other things, in fiber cutoff wavelength failure.

World-wide connected devices, cloud services, 5G (5th generation mobile networks or 5th generation wireless systems, which denotes a major phase of mobile telecommunications standards), and Industry 4.0 (or the fourth industrial revolution, the current trend of automation and data exchange in manufacturing technologies including cyber-physical systems, the Internet of things, and cloud computing), and other advances are driving an exponentially increasing demand for bandwidth. Therefore, optical fiber manufacturers must increase their output and productivity. For next generation optical fiber manufacturing, very large preforms drawn at high speeds are required. The result of the upward collapse process is a "ready-to-draw" solid preform that can sustain multiple days of uninterrupted optical fiber draw, increasing the productivity and optical fiber output as well as reducing the cost and realizing improved fiber yield for users of the preform.

The upward collapse process naturally includes the upward draw (and, optionally, stretch or compression) as well as the low-cost upward online tipping by collapsing the top collar 40 and by matching the outside diameter of the top collar 40 to the outside diameter of the cladding 32. These additional features of the upward collapse process can be done much more accurately and cheaply than for the conventional downward draw process via the exact physics of conservation of mass and glass flow. The upward collapse process, including the draw/stretch and tip features, can also achieve a nearly 100% tipped preform yield with minimal waveguide distortion at the preform end (i.e., more "good" glass). It is also worth pointing out that, with the upward collapse process, the good preform glass yield is nearly 100% without the wasteful sacrificial starting material used for the start-up of the conventional downward draw process.

And the consumption of the material used for the top collar 40 and the bottom collar 44 is also minimal in the upward collapse process.

A single overclad upward collapse process is described above. This process can be applied, however, to combinations of multiple overclad "gap" jacket tubes and overclad cylinders with trivial modifications, such as increasing the outside diameter of the spacer 48 and slightly adjusting the maximum heating power and ending power. Furthermore, the upward collapse process is also capable of accommodating double (or even triple or more) length cladding 32 with the distinct advantage of no need for cladding inside diameter matching (i.e., a smaller inside diameter for the bottom cladding to support the core rods inside the top cladding, as in the case of the conventional downward draw process) because the weight of the stacked core rods 30 is completely supported from below.

An improved, efficient, and low-cost upward collapse tipping process creates a glass preform 100 that has a sharp, short tip relative to the outside diameter of the preform 100; further reduced glass waste; and further minimized clad-to-core waveguide distortion. The same apparatus 10 that is used for overcladding and stretching the large OD (>150 mm) preform 100 is used for the improved tipping process. A zone of the preform assembly is heated inside the furnace and softened. The preform tip is shaped and the process is controlled by the precise movement of the glass above and below the heating zone 16, the timing of the furnace heating, and the sensing of the weight of the lower (or alternatively of the upper) part of the preform 100, which in effect is a measure of the viscosity of the softened material. Once the correct viscosity is reached, the bottom collar holder and vacuum unit 52 is moved away from the top collar holder and vacuum unit 54 with an accelerated velocity profile (derived from the FEM simulation of glass flow and illustrated, for example, in FIG. 6A) which is precisely programmed and controlled using the controller 88 so that the preform tip is optimally shaped (usually short and sharp tipped) with minimum waveguide distortion and waste. The same concept of the highly non-linear, accelerated velocity pulling recipe can also be applied to other tipping processes such as the horizontal preform tipping process with butting lathe and oxy-hydrogen torch heating.

The improved tipping process has several embodiments including, for example, online bottom (or top) and middle tipping processes that produce suitably short preform tips. More generally, the improved tipping process can be applied in any overclad preform-making process where both ends of the initial assembly are held and can be moved in a controlled way. Using the upward collapse and draw process as an example, the continuous online bottom tipping process can be described using nine "snap shots" highlighting steps in the process. The steps are described with reference to FIGS. 7A through 7E. FIGS. 7A, 7B, 7C, 7D, and 7E illustrate five steps in a FEM simulation of the online bottom tipping process, depicting a glass body positioned in a heating element.

When the upward draw is finished, the bottom of the preform 100 is above the center of the heating zone 16 of the apparatus 10. With the preform 100 in that position, and in the first step of the example online bottom tipping process, the heating power is turned off. In the second step of the example online bottom tipping process, the position of the preform 100 in the apparatus 10 is maintained and the bottom of the preform 100 is allowed to cool somewhat (usually a 10 minute "hold" suffices).

Figures 7A, 7B, 7C, 7D, 7E:
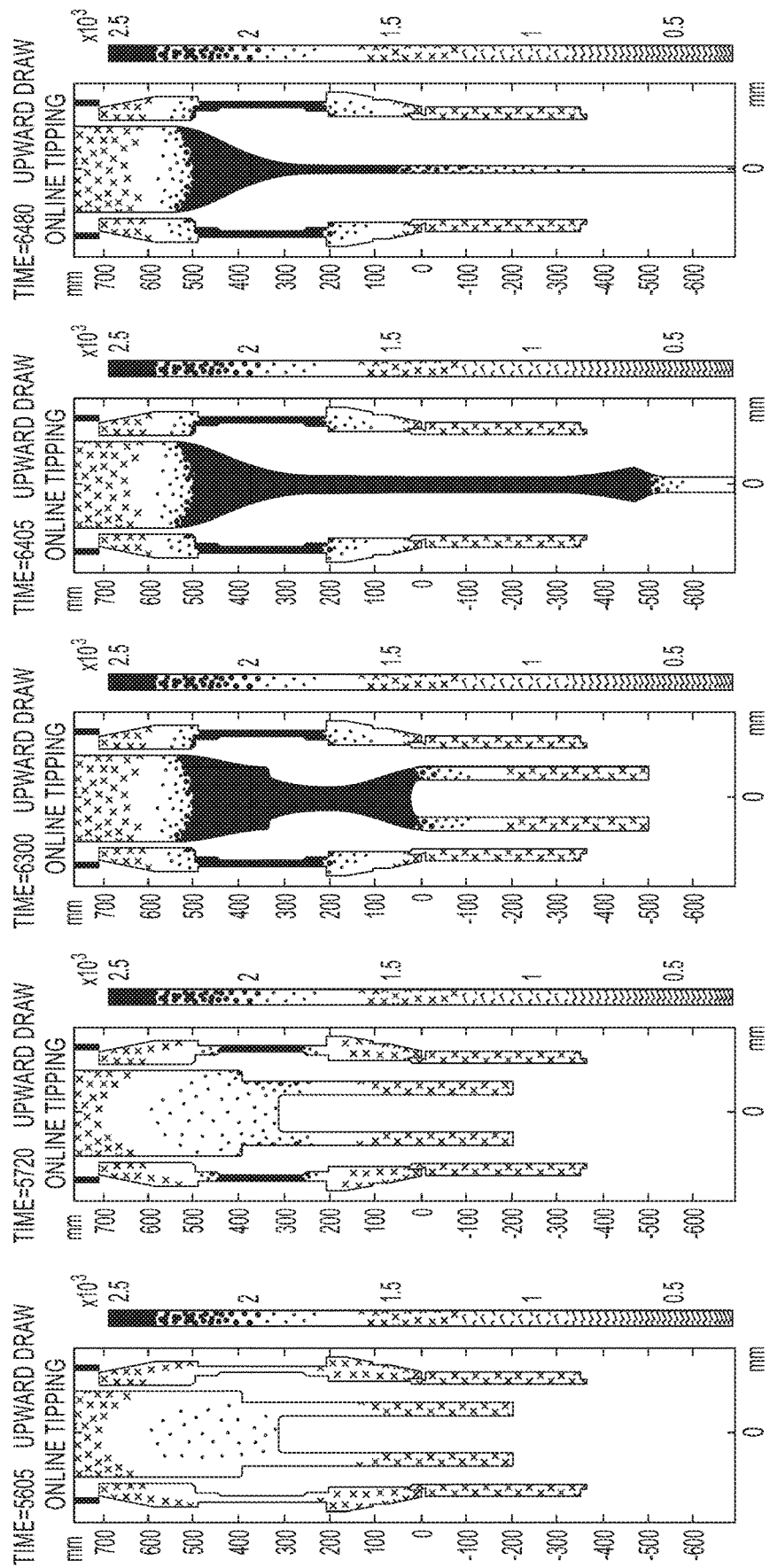
FIGS. 7A, 7B, 7C, 7D, and 7E illustrate five steps in a FEM simulation of the online bottom tipping process, depicting a glass body positioned in a heating element.

In the third step of the example online bottom tipping process, the bottom collar holder and vacuum unit 52 and the top collar holder and vacuum unit 54 are moved together in a synchronized way to re-position the bottom of the preform 100 to be at a certain location slightly higher or lower than the center of the heating zone 16 (i.e., in the tipping position) so that minimum tipping waste of the preform material will result. FIG. 7A shows the temperature profile of the heating zone 16 and preform 100 after 5,605 seconds of the total process, which is the start time for the tipping process to begin in the example, with the bottom of the preform 100 positioned for tipping and cooling. (The total time is exemplary from a simulation with a short cylinder being drawn and tipped.) The optimized tipping position is fixed and predetermined for a preform 100 with a specific OD size and material type. The optimized tipping position can be ascertained through FEM simulation and verified by actual tests, and is discussed further below.

In the fourth step of the example online bottom tipping process, and after the bottom of the preform 100 has been moved to the tipping position, the assembly bottom holding position (or top holding position in an alternative embodiment) is adjusted slightly to transfer all the weight of the assembly onto the top collar holder and vacuum unit 54. A load cell 68 installed on the mounting element 84 of the gripper system 80 can be used, for example, to monitor the weight on the gripper system 80. The slight adjustment in the holding position should zero out the load reading on the gripper system 80.

The heating power is turned on (i.e., the heating zone 16 is re-activated) in the fifth step of the example online bottom tipping process. The heat will be used for tipping. FIG. 7B shows the temperature profile of the heating zone 16 and preform 100 at 5,720 seconds into the process, when the heating zone 16 is re-activated. (Again, the total time is exemplary from a simulation with a short cylinder being drawn and tipped.) The bottom collar holder and vacuum unit 52 starts to move down at 5,793 seconds into the process; therefore, no movement has yet begun for the snap-shots of the example process illustrated in FIGS. 7A and 7B.

As the bottom of the preform 100 is heated and becomes softened, the weight of the assembly below the heating zone 16 will start to rest on the gripper system 80. Thus, the reading of the load cell 68 installed on the gripper system 80 will slowly increase. As the softening of the glass continues, the increasing slope of the reading of the load cell 68 will finally become smaller and eventually reach zero (i.e., the reading becomes flat as it reaches the top) in the sixth step of the example online bottom tipping process.

When the slope of the reading of the load cell 68 installed on the gripper system 80 reaches (or closely approximates) zero, the seventh step of the example online bottom tipping process begins. This step is illustrated in FIG. 7C, which shows the temperature profile of the heating zone 16 and preform 100 after 6,300 seconds of the total process (and 6,300−5,793=507 seconds after the bottom collar holder and vacuum unit 52 starts to move down). The bottom collar holder and vacuum unit 52 moves down following a predetermined, highly non-linear, exponential-like, accelerated speed or velocity profile (very slow at the beginning given viscosity and surface tension, such as a fraction of one millimeter per minute, and very fast at the end of the tipping, such as about 1,800 mm/min).

Figure 6A:
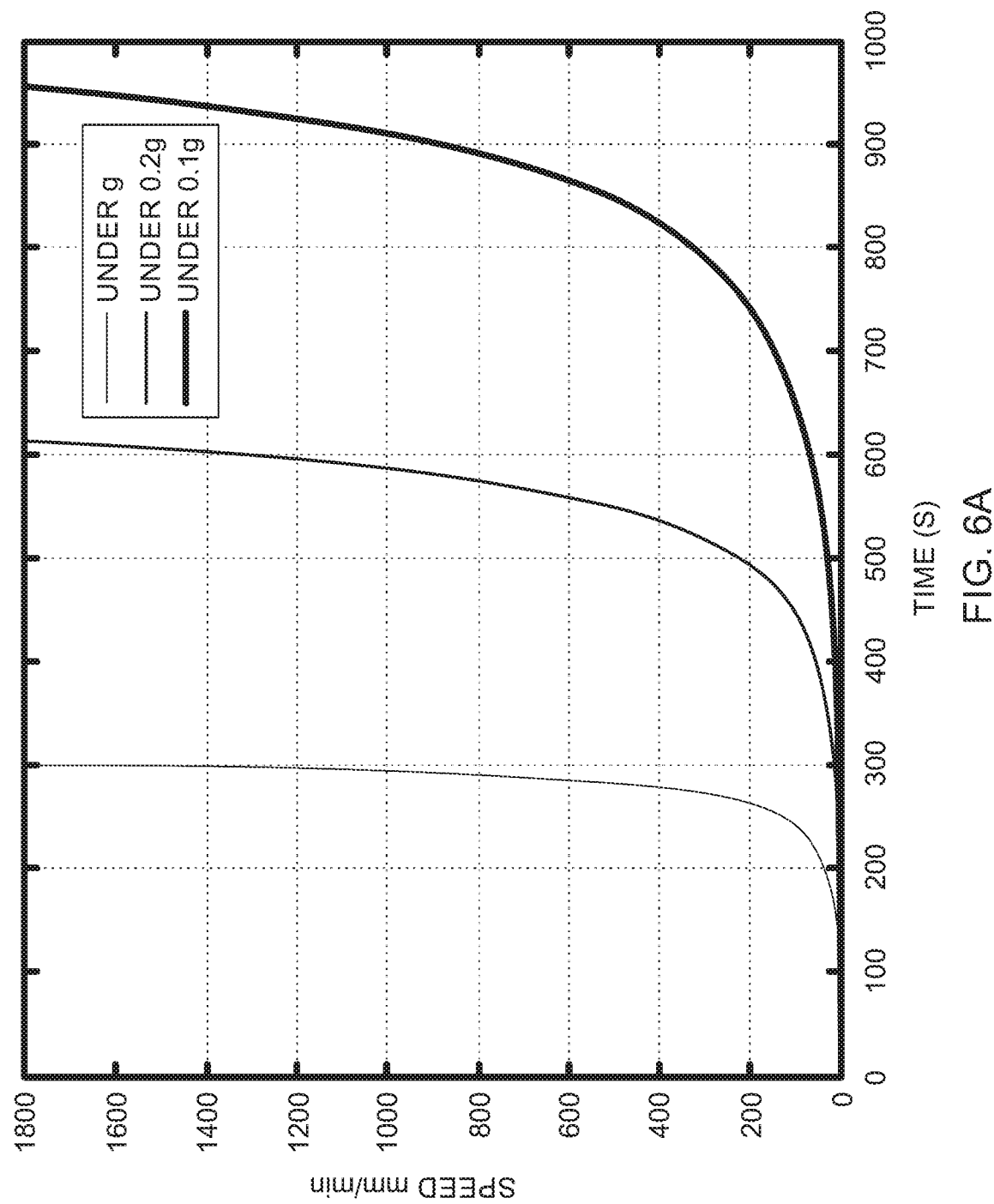
FIG. 6A is a graph of non-linear speed (or velocity) profiles achieved in a bottom tipping operation in accordance with an embodiment of the invention, with FIGS. 6B and 6C showing details of the speed profiles at respectively lower speeds.
Figure 6C:
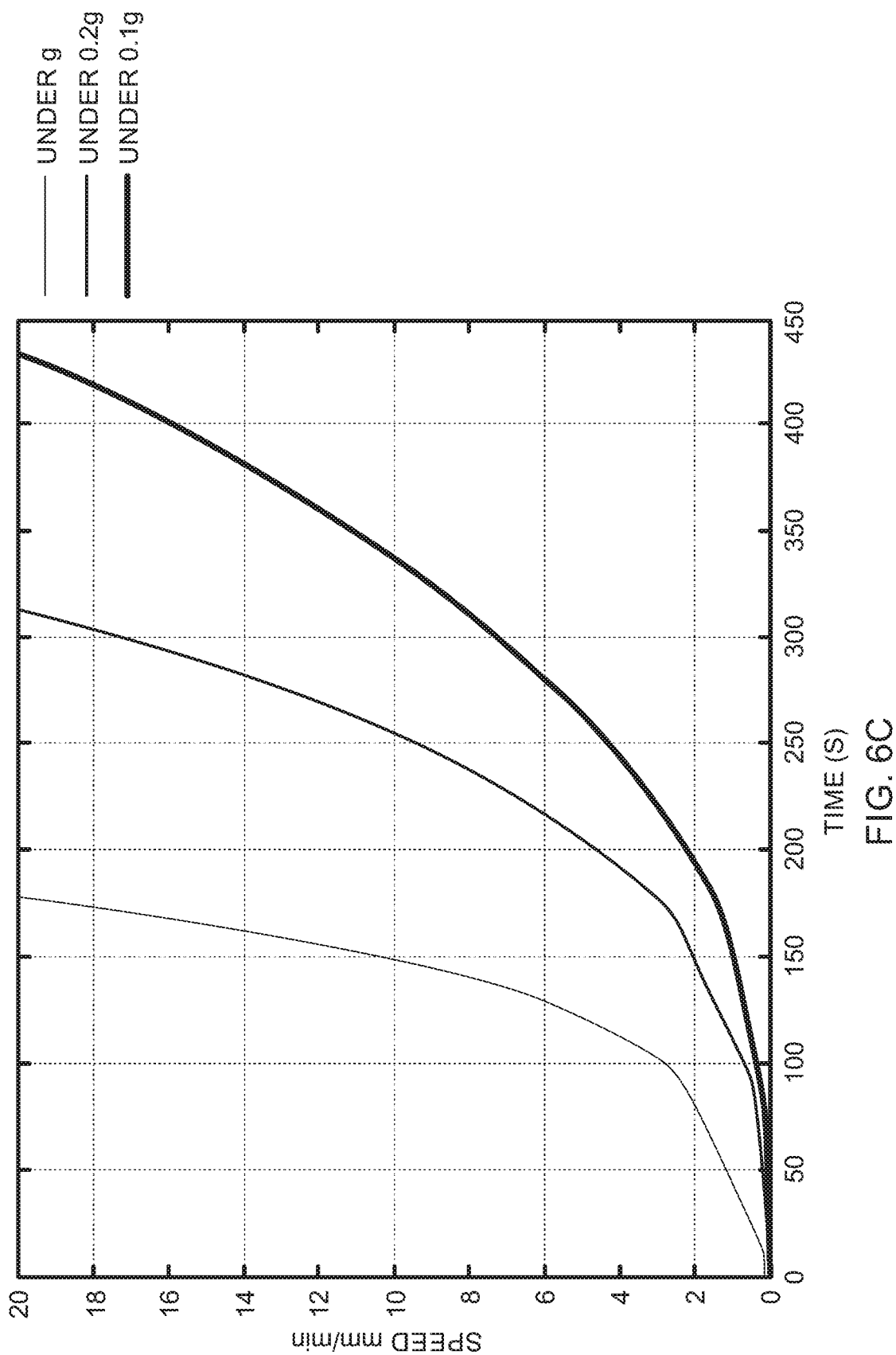

FIG. 6A is a graph of non-linear speed profiles (three example exponential-like curves are shown) achieved in a bottom tipping process in accordance with embodiments of the invention. FIG. 6A shows the profiles for speeds from zero to 1,800 mm/min. FIG. 6B highlights the profiles at lower speeds from zero to 200 mm/min (i.e., FIG. 6B "zooms in" on a portion of FIG. 6A). FIG. 6C highlights the profiles at still lower speeds from zero to 20 mm/min (i.e., FIG. 6C "zooms in" on a portion of FIGS. 6A and 6B). Therefore, FIGS. 6B and 6C show details of the speed profiles at respectively lower speeds.

The particular non-linear speed profile selected can be predetermined or derived from FEM simulation (and, of course, confirmed by testing). The profile may correspond to a free dripping under gravity (g, which is 9.8 m/sec$^2$) as shown in the left-most profile of FIG. 6A. Alternatively, as shown in the center (0.2 g) and right-most (0.1 g) profiles of FIG. 6A, partial gravity may be applied. FEM indicates that the preform tip can be shortened and sharpened under partial gravity relative to processes conducted under free drip. Therefore, the measured free glass drip speed profile under partial gravity (specifically, 0.2 g) was identified as the preferred embodiment. (The example process under discussion and illustrated in FIGS. 7A-7E simulates a 0.2 g partial gravity application; thus, the center profile of FIG. 6A shows that the speed of the bottom collar holder and vacuum unit 52 after 507 seconds of movement is 249 mm/min.) In certain applications, however, the non-linear speed profile may not necessarily follow a partial gravity-induced dripping speed profile. More generally, the non-linear speed profile can be fine-tuned through tests to achieve an even shorter and sharper preform tip.

FIG. 7D shows the temperature profile of the heating zone 16 and preform 100 after 6,405 seconds of the total process (or 6,405−5,793=612 seconds after the bottom collar holder and vacuum unit 52 starts to move down), when the speed of the bottom collar holder and vacuum unit 52 is 1,728 mm/min (see FIG. 6A) and the tip of the preform 100 is forming. FIG. 7E shows the temperature profile of the heating zone 16 and preform 100 after 6,480 seconds of the total process (or 6,480−5,793=687 seconds after the bottom collar holder and vacuum unit 52 starts to move down), when the speed of the bottom collar holder and vacuum unit 52 approaches its maximum value of about 1,800 mm/min (see FIG. 6A) and the tip of the preform 100 has been formed. As the speed of the bottom collar holder and vacuum unit 52 approaches the maximum value of the non-linear speed profile, in the eighth step of the example online bottom tipping process, the power to the heating zone 16 is turned off and the top collar holder and vacuum unit 54 is moved upward at a relatively fast speed (for example, about 90 mm/min or more) for a short time (for example, a couple of minutes). In the meantime, the bottom collar holder and vacuum unit 52 continues its downward movement until it completes the predetermined non-linear speed profile. By moving up the top collar holder and vacuum unit 54, the bulk of the tip of the preform 100 is positioned above the maximum heating zone and further glass slumping on the bulk of the tip is avoided. Shutting off the power before the stretch is finished keeps the thin glass strand in the middle of the furnace under tension and prevents the strand from curling up due to excessive heat.

In the ninth and final step of the example online bottom tipping process, the thin glass strand is snap cut below the furnace. Then the tipped preform 100 is pulled out of the top of the furnace by the top collar holder and vacuum unit 54.

Turn now to the online middle tipping process, by which two tipped preforms can be made simultaneously. The continuous online middle tipping process can be described using ten "snap shots" highlighting steps in the process. The steps are described with reference to FIGS. 8A through 8D. FIGS. 8A, 8B, 8C, and 8D illustrate four steps in a FEM simulation of the online middle tipping process, depicting a glass body positioned in a heating element.

When the upward draw is finished, the bottom of the preform 100 is above the center of the heating zone 16 of the apparatus 10. This position defines the first step of the example online middle tipping process, as it does for the first step of the example online bottom tipping process described above. In the second step of the example online middle tipping process, however, the heating zone 16 is maintained at a certain pre-heating level (for example, the heating power might be set at 50 kW) while the position of the preform 100 in the apparatus 10 is maintained.

Figures 8A, 8B, 8C, 8D:
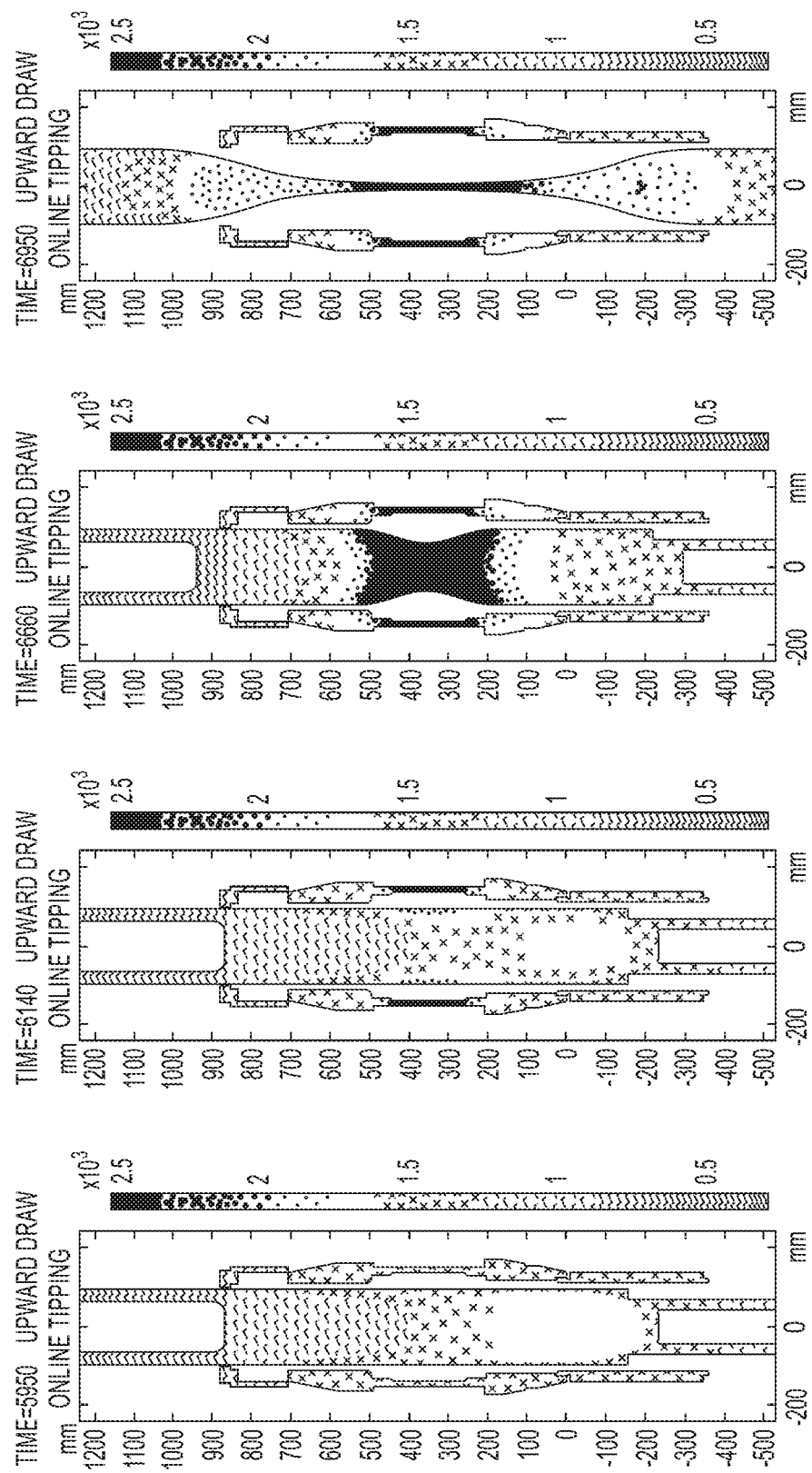
FIGS. 8A, 8B, 8C, and 8D illustrate four steps in a FEM simulation of the online middle tipping process, depicting a glass body positioned in a heating element.

In the third step of the example online middle tipping process, the bottom collar holder and vacuum unit 52 and the top collar holder and vacuum unit 54 are moved together in a synchronized way to re-position the midpoint of the preform 100 to be at approximately the center of the heating zone 16 (i.e., in the tipping position). FIG. 8A shows the temperature profile of the heating zone 16 and preform 100 after 5,950 seconds of the total process, which is the start time for the tipping process to begin in the example. In contrast to the example online bottom tipping process described above, there is no optimized position for the start of the example online middle tipping process; tipping is simply done in the middle of the preform 100.

In the fourth step of the example online middle tipping process, and after the bottom of the preform 100 has been moved to the tipping position, the assembly bottom holding position (or top holding position in an alternative embodiment) is adjusted slightly to transfer all the weight of the assembly onto the top collar holder and vacuum unit 54. The load cell 68 installed on the mounting element 84 of the gripper system 80 can be used, for example, to monitor the weight on the gripper system 80. The slight adjustment in the holding position should zero out the load reading on the gripper system 80.

The heating power is increased in the fifth step of the example online middle tipping process. The increased heat will be used for tipping. FIG. 8B shows the temperature profile of the heating zone 16 and preform 100 at 6,140 seconds into the process, when the temperature of the heating zone 16 is increased. The bottom collar holder and vacuum unit 52 starts to move down and the top collar holder and vacuum unit 54 starts to move up at 6,163 seconds into the process; therefore, no movement has yet begun for the snap-shots of the example process illustrated in FIGS. 8A and 8B.

As the middle of the preform 100 is heated and becomes softened, the weight of the assembly below the heating zone 16 will start to rest on the bottom collar holder and vacuum unit 52. Thus, the reading of the load cell 68 installed on the gripper system 80 will slowly increase. As the softening of the glass continues, the increasing slope of the reading of the load cell 68 will finally become smaller and eventually reach zero (i.e., the reading becomes flat as it reaches the top) in the sixth step of the example online middle tipping process.

When the slope of the reading of the load cell 68 installed on the gripper system 80 reaches (or closely approximates) zero, the seventh step of the example online middle tipping process begins. This step is illustrated in FIG. 8C, which shows the temperature profile of the heating zone 16 and preform 100 after 6,660 seconds of the total process (and 6,660−6,163=497 seconds after the bottom collar holder and vacuum unit 52 starts to move down and the top collar holder and vacuum unit 54 starts to move up). The bottom collar holder and vacuum unit 52 moves down following a predetermined, highly non-linear, exponential-like, accelerated speed or velocity profile.

Simultaneously and symmetrically, the top collar holder and vacuum unit 54 starts to move up following the same predetermined, highly non-linear, exponential-like, accelerated speed profile. The highly non-linear speed profile is a fraction (for example, one quarter) of the non-linear speed profile applied in the example online bottom tipping process described above. Thus, the speed of both the bottom collar holder and vacuum unit 52 and the top collar holder and vacuum unit 54 at the snap shot of FIG. 8C is 52.56 mm/min. That speed is calculated with reference to the 0.2 g center profile of FIG. 6A, which depicts a speed of 210.24 mm/min at 497 seconds, and 210.24 mm/min×0.25=52.56 mm/min. The maximum speed of the bottom collar holder and vacuum unit 52 and of the top collar holder and vacuum unit 54 will depend, of course, on the particular application. In the present example, that maximum speed is arbitrarily chosen to be about 90 mm/min.

FIG. 8D shows the temperature profile of the heating zone 16 and preform 100 after 6,950 seconds of the total process (and 6,950−6,163=787 seconds after the bottom collar holder and vacuum unit 52 starts to move down and the top collar holder and vacuum unit 54 starts to move up). At this point in time, both the bottom collar holder and vacuum unit 52 and the top collar holder and vacuum unit 54 have already attained their maximum speed. Once the bottom collar holder and vacuum unit 52 and of the top collar holder and vacuum unit 54 have attained their maximum speed, the symmetrical stretch of the preform 100 is maintained without further increasing the speed.

The eighth step of the example online middle tipping process begins once the predetermined amount of separation stretch (slightly smaller than twice the desired tip length) is achieved. At that point, the heating power is turned off (i.e., the heating zone 16 is de-activated) and the speed of the top collar holder and vacuum unit 54 is reversed so that the downward speed of the top collar holder and vacuum unit 54 is slightly smaller than the downward speed of the bottom collar holder and vacuum unit 52, to keep the soft thin glass strand in the heating zone 16 under tension. Once the distance created by the downward movement has reached about half of the length of the heating zone 16 (i.e., the thinnest part of the double tip has been moved below the heating zone 16), the downward speed of the top collar holder and vacuum unit 54 is adjusted to equal the downward speed of the bottom collar holder and vacuum unit 52.

The ninth step of the example online middle tipping process begins when the thinnest part of the double tip has moved out of the bottom of the heating zone 16 and reached a position where the thin strand can be easily cut. Once the double tip is in that position, the downward movement of both the top collar holder and vacuum unit 54 and the bottom collar holder and vacuum unit 52 is stopped simultaneously.

In the tenth and final step of the example online middle tipping process, the thin glass strand is snap cut at the thinnest part, i.e., the middle of the double tip. Then the upper tipped preform 100 is pulled out of the top of the furnace by the top collar holder and vacuum unit 54. The lower tipped preform 100 is removed below the furnace.

The controller 88 can be used to automate completely the online bottom tipping process and the online middle tipping process described above. Alternatively, the controller 88 can be used to automate substantially one or both of those processes. For example, the final step of cutting the tip after the tipping is completed might be done manually by an operator.

Figure 9C:
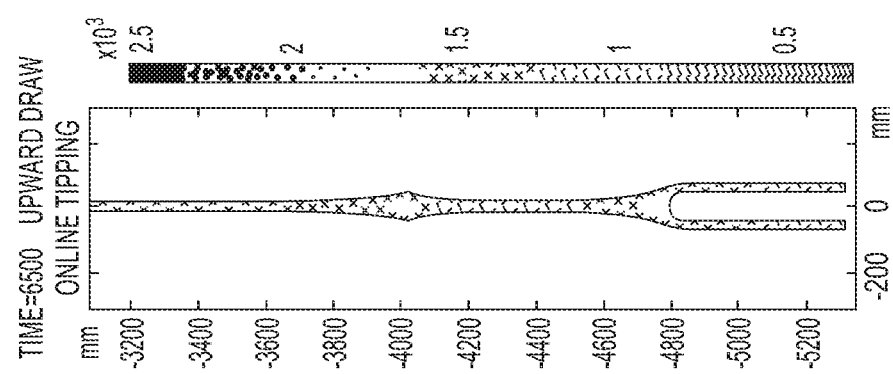
FIG. 9C illustrates the glass drip at the bottom during the online bottom tipping process as predicted by FEM simulation.
Figure 9B:
FIG. 9B illustrates the glass drip at the bottom during the online bottom tipping process.
Figure 9A:
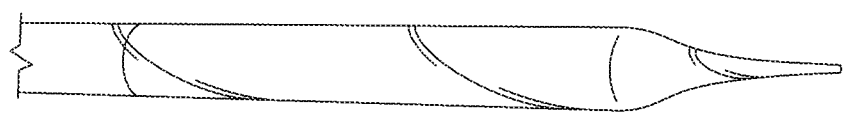
FIG. 9A illustrates the tip that resulted from the online bottom tipping process before the tip is snap cut at the required tip outside diameter.

Actual tests were run implementing both the online bottom tipping process and the online middle tipping process described above. FIG. 9A illustrates the actual tip that was achieved using the online bottom tipping process; the tip had not yet been snap cut at the required tip OD. FIG. 9B illustrates the actual glass drip at the bottom of the preform 100. FIG. 9C illustrates the glass drip at the bottom during the online bottom tipping process as predicted by FEM modelling. The actual test implementing the online bottom tipping process confirmed the results predicted by FEM simulation.

Figure 10:
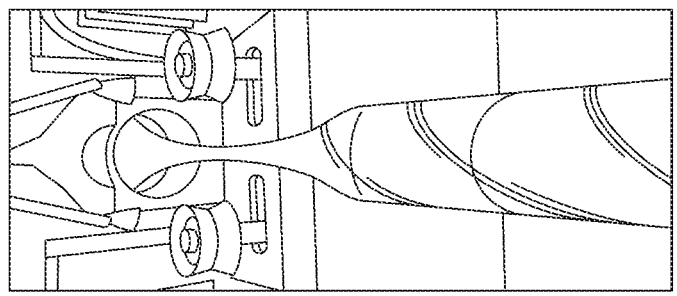
FIG. 10 illustrates the final result of a middle tipping test at a position ready for snap cutting at the middle of the double tip.

An actual test was also run implementing the online middle tipping process described above. FIG. 10 illustrates the final result of a middle tipping test at a position ready for snap cutting at the middle of the double tip. As for the online bottom tipping process, the actual test for the online middle tipping process confirmed the results predicted by FEM simulation.

In order to create the best preform 100 possible for a particular optical fiber draw, a number of characteristics of the preform 100 and of the tipping process used to create the preform 100 must be balanced and optimized. Among those characteristics are the shape of the tip of the preform 100, the tipping position (which can create or reduce glass waste), and, perhaps most important, the ratio of the OD of the preform 100 to the core OD. Therefore, experiments were run to investigate the optimal tip shape, the tipping position, and the ratio.

Turn first to the tip shape. With the help of FEM simulations, three different tipping speed profiles were investigated for an online bottom tipping process applied to a 200 mm OD preform 100. FIG. 11A illustrates the temperature profile of the heating zone 16 and the preform 100 with a speed profile under 0.2 g partial gravity 6,430 seconds into the process (i.e., at a snap shot of the continuous process). (The total time is exemplary from a simulation with a short cylinder being drawn and tipped.) FIG. 11B illustrates the temperature profile of the heating zone 16 and the preform 100 with a speed profile under 1.0 g gravity 6,317.5 seconds into the process (i.e., at a snap shot of the free-drip continuous process). FIG. 11C illustrates the temperature profile of the heating zone 16 and the preform 100 with a linear speed profile of 0.001 m/sec 8,000 seconds into the process (i.e., at a snap shot of the continuous process).

Figure 12:
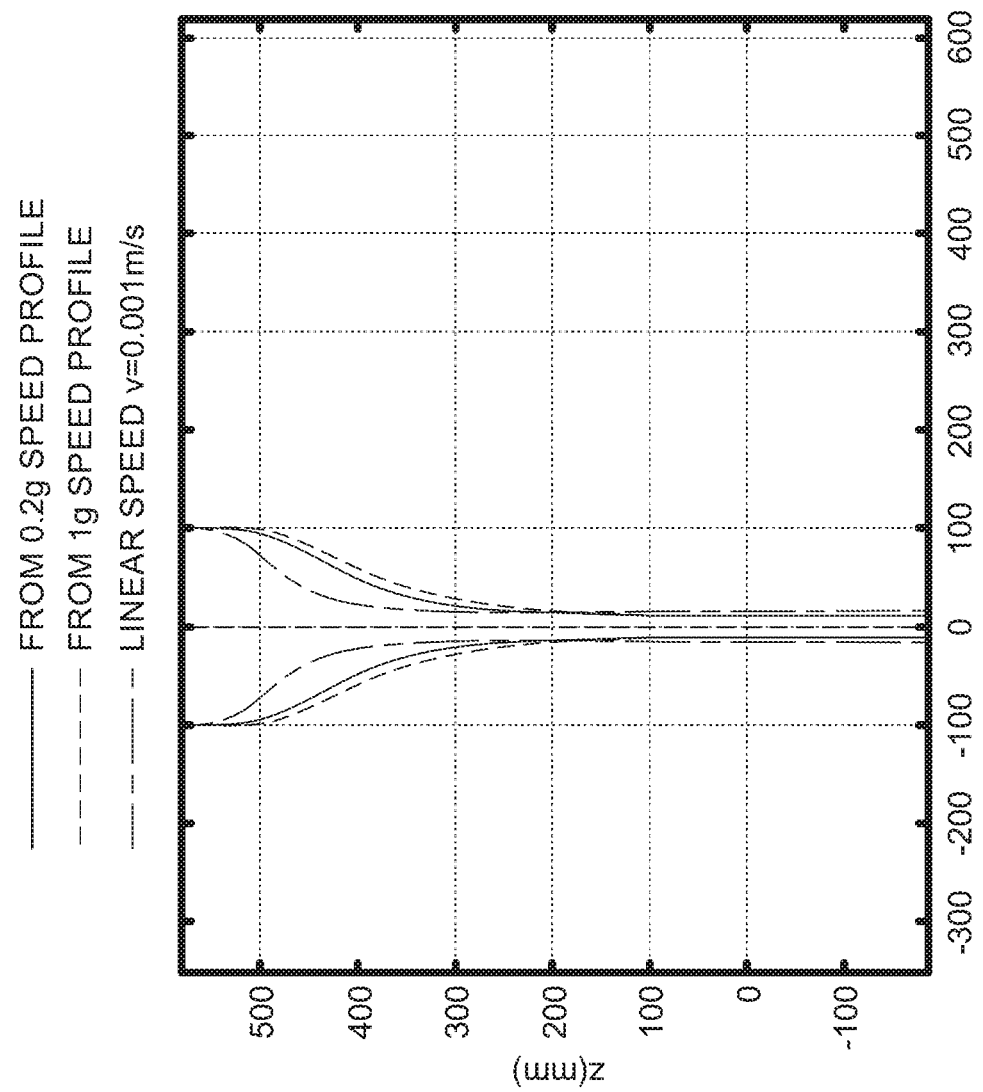
FIG. 12 is a graph of the preform height against the preform radius, comparing the preform tip shapes that result from each of the three different tipping speed profiles illustrated in FIGS. 11A, 11B, and 11C.

FIG. 12 is a graph of the preform height (z) against the preform radius (r), comparing the preform tip shapes that result from each of the three different tipping speed profiles illustrated in FIGS. 11A, 11B, and 11C. The preform tip shapes that result from the non-linear 0.2 g and 1 g speed profiles are relatively close; the preform tip shape that results from the relatively slow linear speed is substantially sharper with less taper. The trade-off with using the linear speed profile, however, is that longer tipping times are required (increasing cost) and more waste glass is produced. Such considerations might prompt selection of the 0.2 g speed profile as resulting in the best compromise tip shape.

Figure 13C:
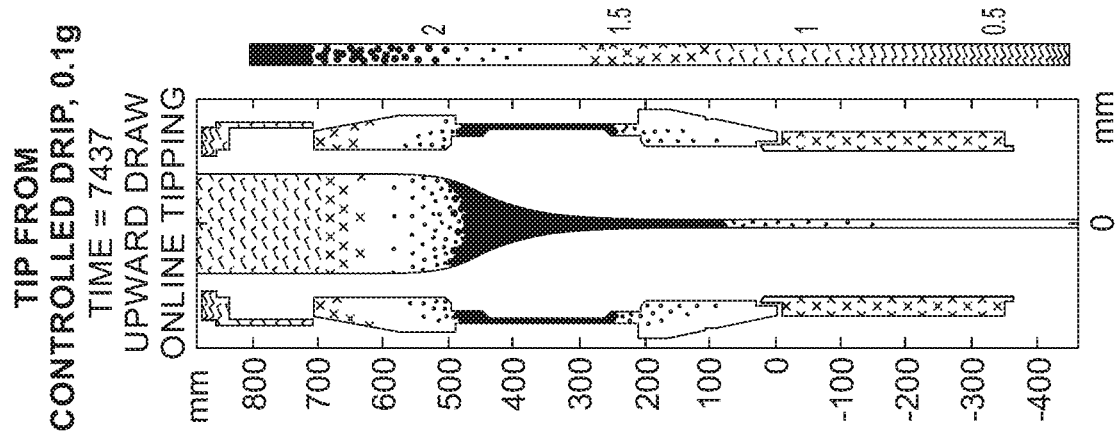
FIGS. 13A, 13B, and 13C provide temperature profiles illustrating three different tipping speed profiles for an online bottom tipping process applied to a 150 mm OD preform.
Figure 13B:
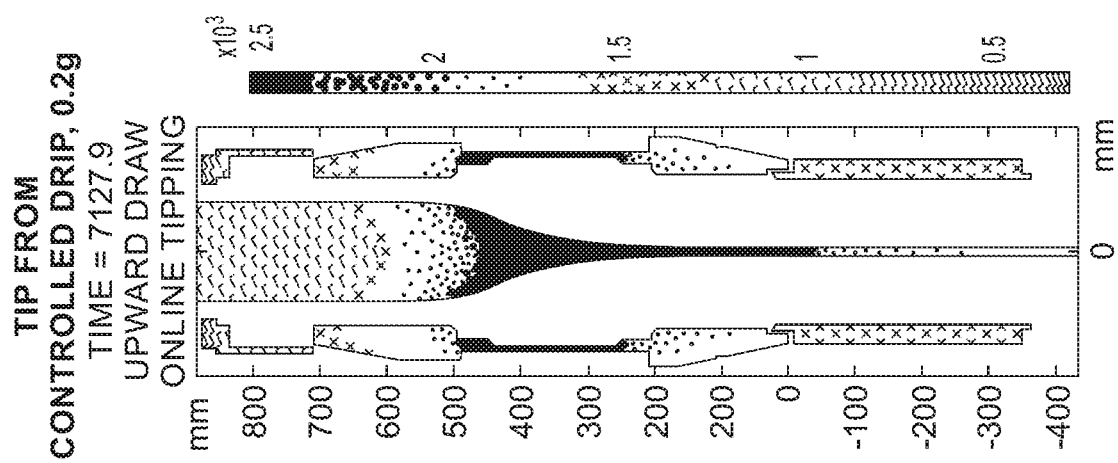
Figure 13A:
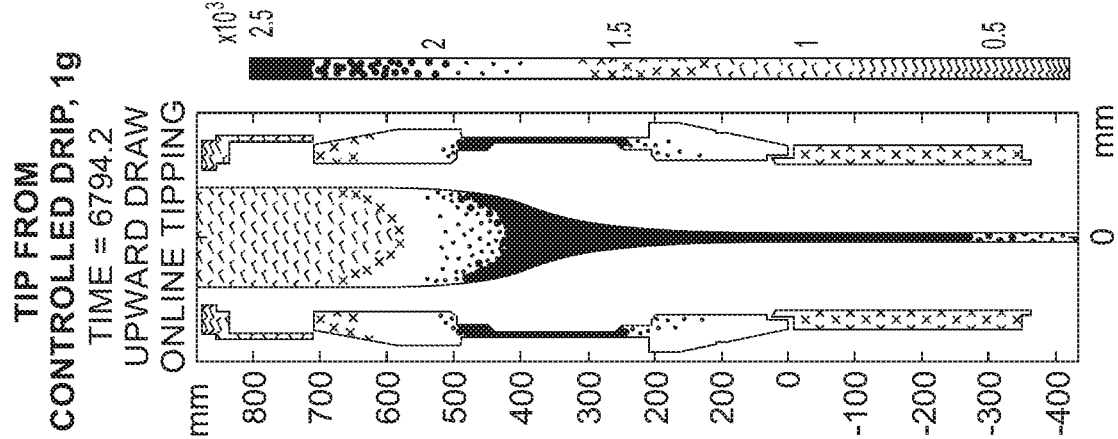

Next, again with the help of FEM simulations, three different tipping speed profiles were investigated for an online bottom tipping process applied to a 150 mm OD preform 100. FIG. 13A illustrates the temperature profile of the heating zone 16 and the preform 100 with a speed profile under 1.0 g gravity 6,794.2 seconds into the process (i.e., at a snap shot of the free-drip continuous process). FIG. 13B illustrates the temperature profile of the heating zone 16 and the preform 100 with a speed profile under 0.2 g partial gravity 7,127.9 seconds into the process (i.e., at a snap shot of the continuous process). FIG. 13C illustrates the temperature profile of the heating zone 16 and the preform 100 with a speed profile under 0.1 g partial gravity 7,437 seconds into the process (i.e., at a snap shot of the continuous process).

Figure 14:
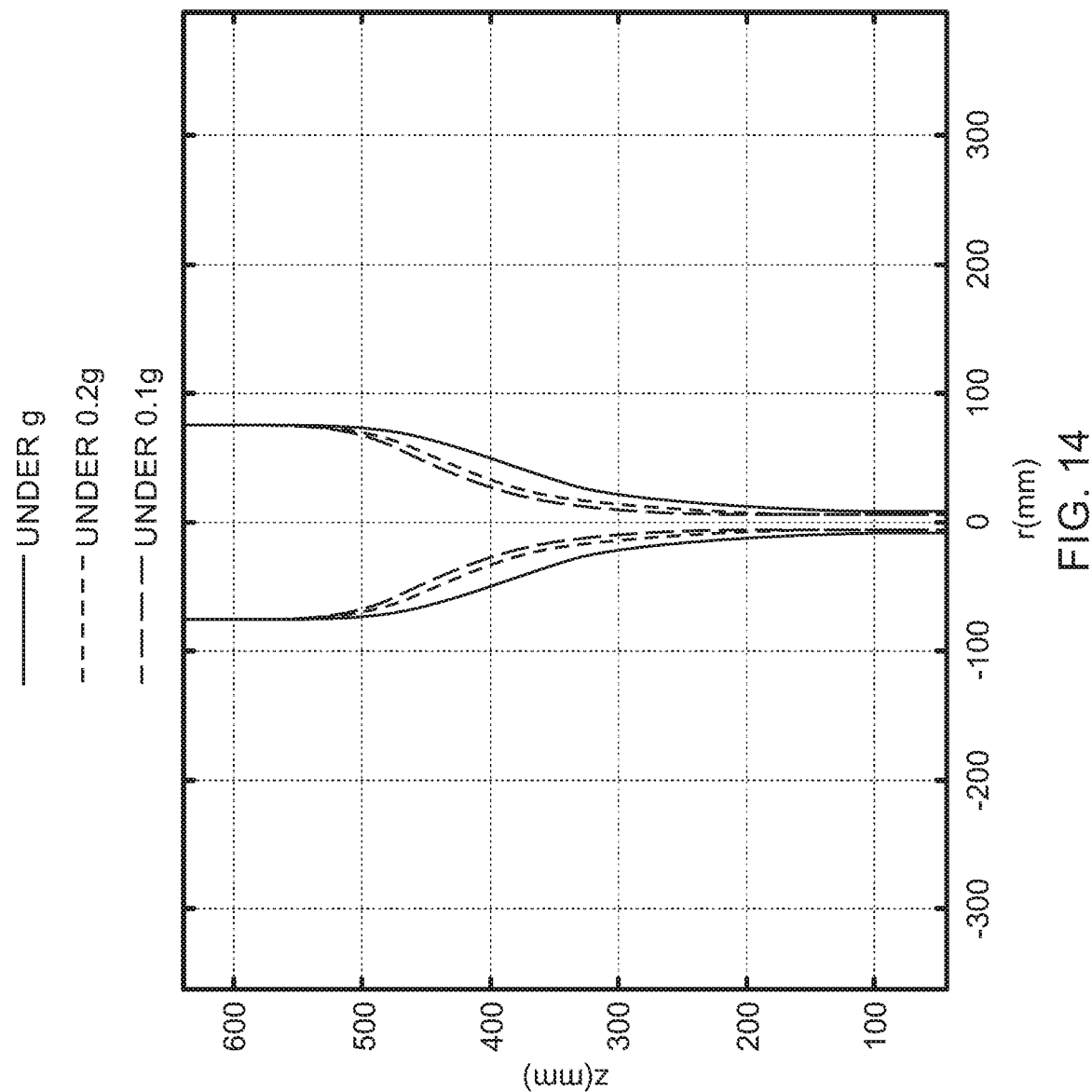
FIG. 14 is a graph of the preform height against the preform radius, comparing the preform tip shapes that result from each of the three different tipping speed profiles illustrated in FIGS. 13A, 13B, and 13C.

FIG. 14 is a graph of the preform height (z) against the preform radius (r), comparing the preform tip shapes that result from each of the three different tipping speed profiles illustrated in FIGS. 13A, 13B, and 13C. The preform tip shapes that result show a significant difference and a correlation: the lower the gravity of the speed profile, the sharper the preform tip shape. The non-linear 0.2 g and 0.1 g speed profiles are relatively close; the preform tip shape that results from the 1.0 g speed profile is substantially less sharp with more taper. Again, a balance of considerations might prompt selection of the 0.2 g speed profile as resulting in the best compromise tip shape.

As identified above, the second characteristic of the preform 100 and of the tipping process used to create the preform 100 that must be balanced and optimized is the position of the preform 100 relative to the center of the heating zone 16 when the tipping process begins (namely, the tipping position). Three different tipping positions were investigated, with the help of FEM simulations, for an online bottom tipping process applied to a 200 mm OD preform 100 using a 0.2 g speed profile. FIG. 15A illustrates the temperature profile of the heating zone 16 and the preform 100 with a tipping position located 35 mm above the center of the heating zone 16 at 6,490 seconds into the process (i.e., at a snap shot of the continuous process). FIG. 15B illustrates the temperature profile of the heating zone 16 and the preform 100 with a tipping position located 50 mm above the center of the heating zone 16 at 6,430 seconds into the process (i.e., at a snap shot of the continuous process). FIG. 15C illustrates the temperature profile of the heating zone 16 and the preform 100 with a tipping position located 70 mm above the center of the heating zone 16 at 7,222.7 seconds into the process (i.e., at a snap shot of the continuous process).

Figure 16A:
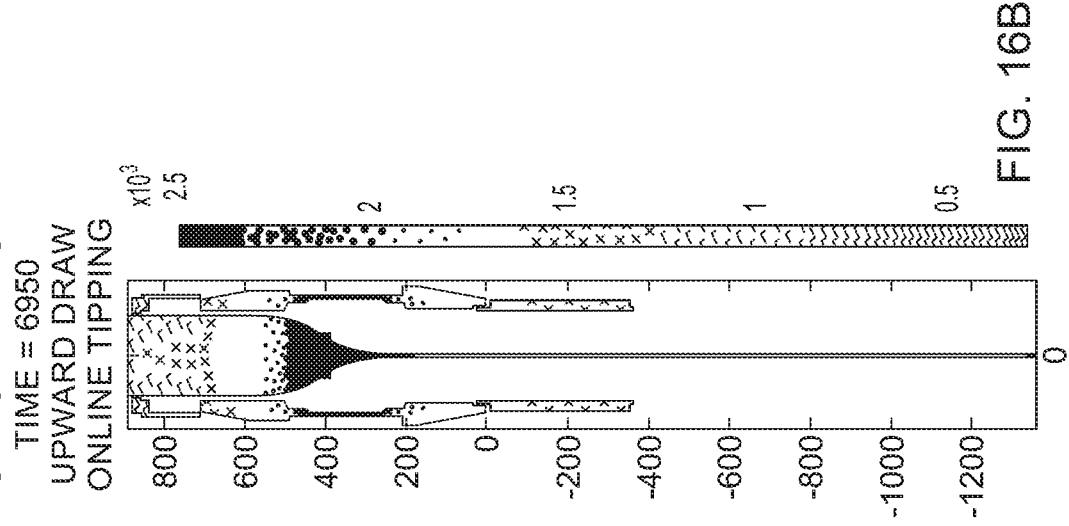
FIG. 16A illustrates the temperature profile of the heating zone and the preform with a tipping position located 70 mm above the center of the heating zone at 6,950 seconds into the process (i.e., at a snap shot of the continuous process)
Figure 16B:
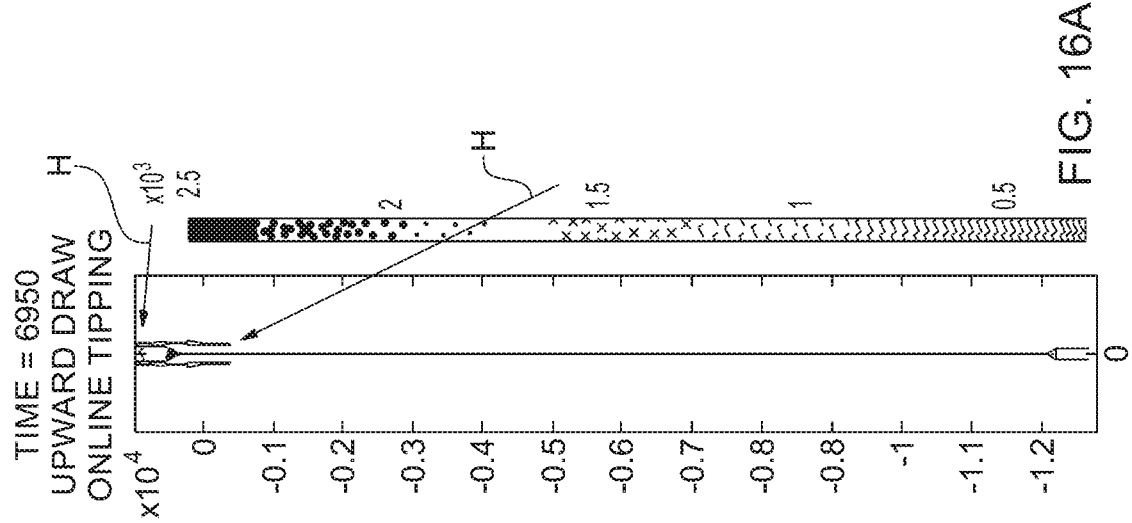
FIG. 16B is an expanded view of FIG. 16A taken between the arrows "H" in FIG. 16A.

A comparison of the tipping position results illustrated in FIGS. 15A, 15B, and 15C shows that the higher the tipping position, the less glass waste produced from the preform 100. These results suggest the desirability of a higher tipping position. FIG. 16A illustrates the temperature profile of the heating zone 16 and the preform 100 with a tipping position located 70 mm above the center of the heating zone 16 at 6,950 seconds into the process (i.e., at a snap shot of the continuous process); FIG. 16B is an expanded view of FIG. 16A taken between the arrows "H" in FIG. 16A. FIGS. 16A and 16B highlight the minimal glass waste achieved using the highest tipping position investigated.

Again, however, a trade-off exists. Higher tipping positions, such as the 70 mm tipping position illustrated in FIGS. 15C, 16A, and 16B, require a drip that is too long before the preform 100 is tipped. Long drips increase the cost of the tipping process. In addition, higher tipping positions are difficult, if not impractical, to achieve using the apparatus 10. The bottom collar holder and vacuum unit 52 must position and hold the preform 100 at the tipping position and, for higher tipping positions, then traverse a relatively long distance during drip. A balance of considerations might prompt selection of the 50 mm tipping position as resulting in the best compromise between the least amount of preform waste and a practical amount of drip length.

As identified above, the third characteristic of the preform 100 and of the tipping process used to create the preform 100 that must be balanced and optimized is the ratio of the OD of the preform 100 to the core OD. That ratio is investigated, with the help of a FEM simulation, for an online bottom tipping process applied to a 200 mm OD preform 100 using a 0.2 g speed profile. FIG. 17A is a graph of the preform height (z) against the preform radius (r). The preform OD is shown in a solid line; the core OD is shown in a substantially vertical dashed line. Substantially horizontally oriented dashed lines demark sections of the preform 100 including the core. Each section yields an OD measurement for the preform 100 and an OD measurement for the core of the preform 100. Those measurements are illustrated graphically in FIG. 17B, which is a graph of the preform height (z) against the ratio of preform OD/core OD.

FIG. 17A shows that, for the example simulation illustrated, acceptable "good" preform glass starts at a preform height of about 300 mm. Glass below that height constitutes waste. The waste glass is cut off before the preform 100 is used to draw an optical fiber and, therefore, is unimportant.

Figure 17B:
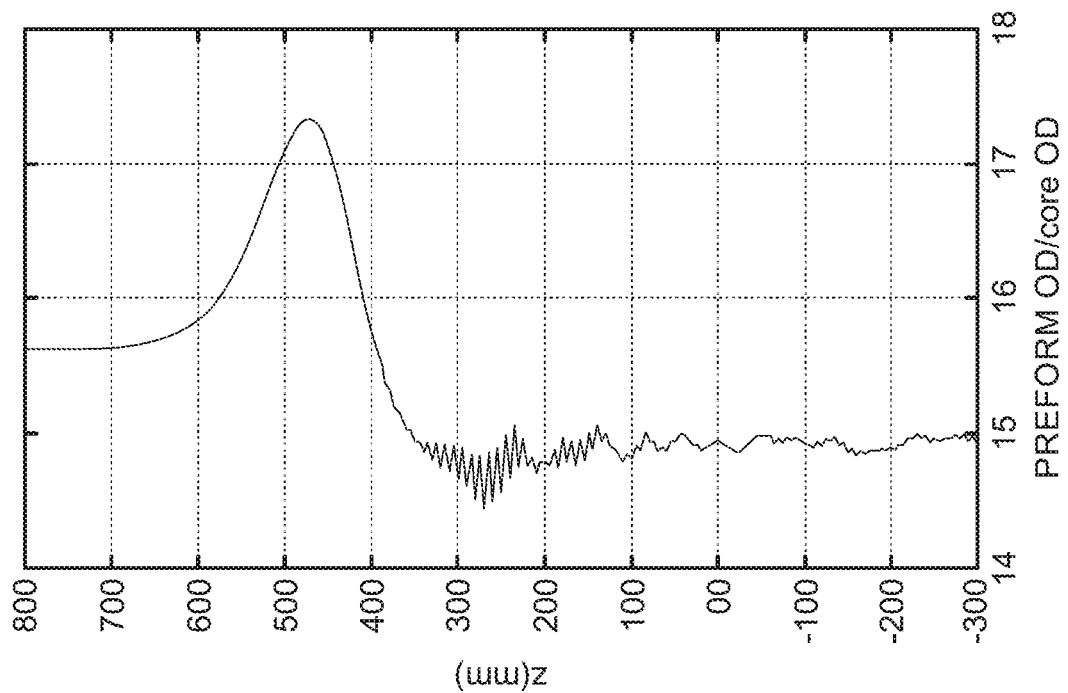
FIG. 17B is a graph of the preform height against the ratio of preform OD/core OD, using measurements taken from FIG. 17A.
Figure 17A:
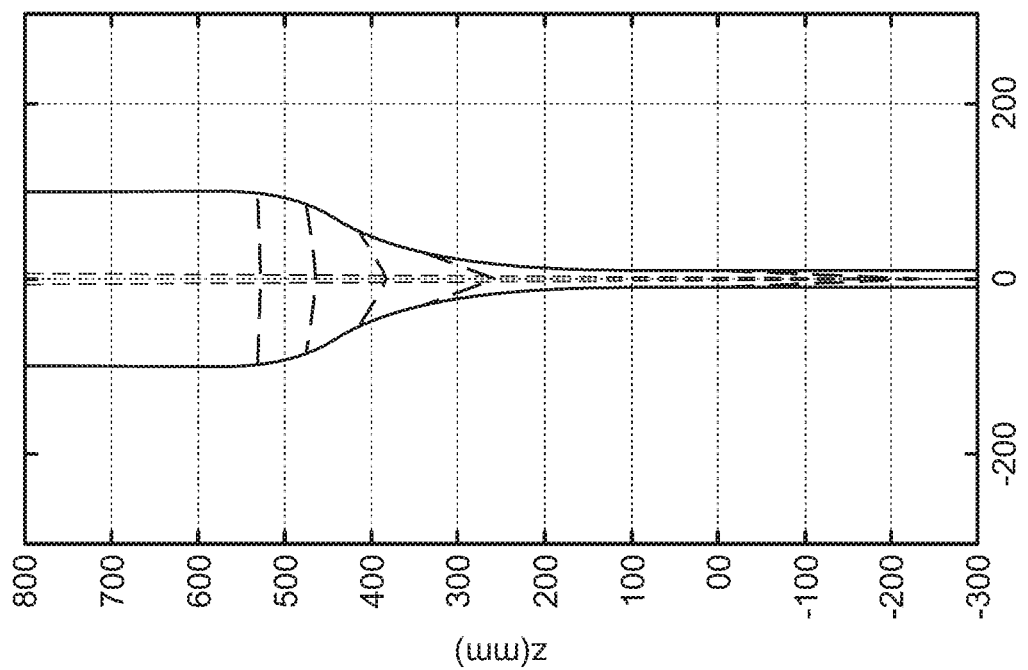
FIG. 17A is a graph of the preform height against the preform radius, with substantially horizontally oriented dashed lines demarking sections of the preform, for an online bottom tipping process applied to a 200 mm OD preform using a 0.2 g speed profile.

FIG. 17B shows that the transition in size from the large OD preform 100 to the much smaller tip results in an undesirably high (distorted) ratio of preform OD/core OD in the middle of the taper. For the example simulation illustrated in FIG. 17B, the ratio begins at 15.6 at the top of the preform 100 and peaks at over 17. The ratio recovers, however, to a constant, "good" value just below 15 when the preform 100 exits the taper region into the tip due to the physics of heat transfer and glass flow. The glass flows in both the core rod 30 and cladding 32 during the upward draw online tipping process.

Thus, the preform tipping process actually results in a distorted clad-to-core ratio inside the tip. The important point is, however, that the preform tip when drawn into an optical fiber will result in a good and constant clad-to-core ratio fiber. The reason for this result is that in both the preform tipping process and the fiber drawing process the large transition in size from the large OD preform to the small tip (during the tipping process) or to the fiber (during the fiber drawing process) yields a very similar higher clad-to-core peak ratio in the middle of the taper but such high clad-to-core ratio will recover to a constant, good value when it exits the taper region into the tip or fiber due to the same physics of heat transfer and glass flow. In other words, drawing the distorted clad-to-core ratio preform tip will actually result in good clad-to-core ratio fiber, very much like how the clad-to-core ratio will evolve in a normal fiber draw from a large preform through the taper and into the fiber. In summary, the preform tipping process disclosed above is an excellent match for the ultimate and subsequent optical fiber drawing process.

Figure 18:
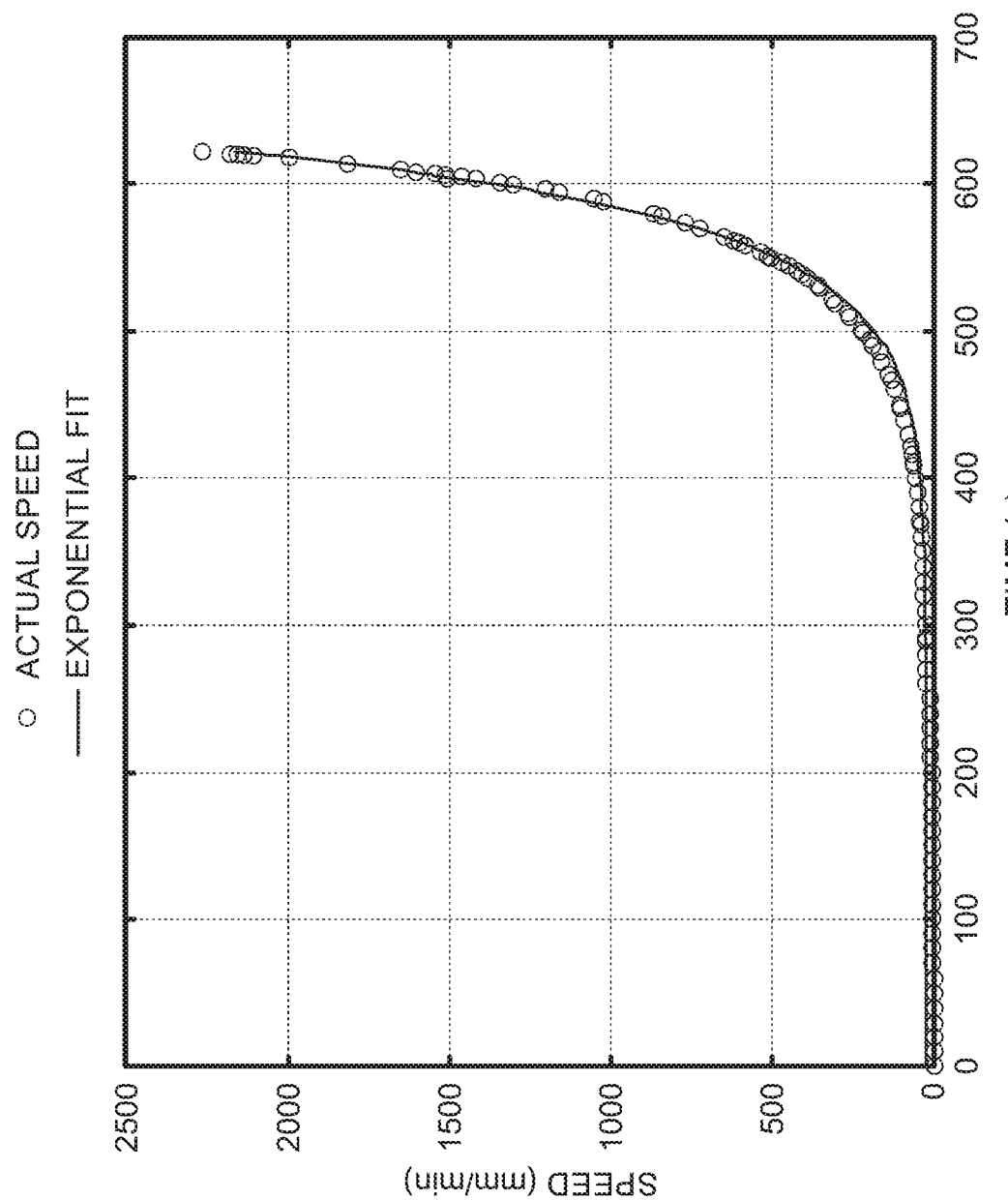
FIG. 18 is a graph of a non-linear speed (or velocity) profile achieved in a bottom tipping operation in accordance with an embodiment of the invention reflecting a least square fitted exponential function.

FIG. 18 is a graph of a non-linear speed (or velocity) profile achieved in a bottom tipping operation in accordance with an embodiment of the invention including a least square fitted exponential function. The FEM simulation reflects an online bottom tipping process applied to a 150 mm OD preform 100 using 0.2 g. The discrete data points were generated as "actual" speeds using the simulation. The continuous exponential curve is shown as a solid line through many of the data points. The curve follows the least square fitted function $y=0.3117*\exp(0.0207*x-4.0428)$, where y represents speed (mm/min) and x represents time (sec). The abscissa and the ordinate are the horizontal and vertical axes, respectively, forming the x-axis and y-axis of the two-dimensional graph illustrated in FIG. 18.

The overall fit of the curve against the data points shows that the 0.2 g speed profile is indeed "exponential-like." The quality of the curve fit at the lower speeds is not as good as is the fit at higher speeds. Nevertheless, the non-linear velocity profile certainly approximates an exponential curve.

The online tipping processes described above can be used to make tipped preforms ready to draw into optical fibers. FEM simulation has been utilized to identify the tipping process recipes efficiently and minimize the amount of actual trials needed. Readings from the load cell 68 installed on the mounting element 84 of the gripper system 80 have been used to guarantee a robust implementation of the designed recipes.

The online tipping processes achieve the objects outlined above and afford many advantages. For example, the processes save significant amounts of process time and cost when compared to conventional offline tipping processes. They also reduce the waste of good preform material: the optimized online bottom tipping process helps to reduce waste to <1% of the total preform 100 and the waste of the optimized online middle tipping process approaches zero. Perhaps most important, the online tipping processes optimize the tip geometry (length and width) and shape for the most efficient fiber draw start up.

More specifically, the online tipping processes achieve a minimum volume of glass in the preform tip. A related advantage is that the processes achieve a minimum tip length (relative to the preform diameter) and a sharp tip end so that it is relatively easy to start up the subsequent fiber draw with a minimum amount of glass drip and start-up time. Another related advantage is that the processes minimize waveguide distortion in the final optical fiber drawn from the preform 100. A 200 mm outside diameter (large) preform 100 resulting from the online tipping processes may be drawn, for example, into a 125 µm outside diameter (small) optical fiber having a waveguide core diameter of 8.2 µm (or a ratio of 125/8.2=15.2) with minimal waveguide distortion. The preform tip has an appropriate clad-to-core ratio so that the fiber drawn from it will have the correct fiber cutoff performance with minimum failure and waste. Depending on the tipping process, at least some conventional and commercially available preform tips contain a significant amount of distorted ("bad") waveguide glass so that they cannot be drawn into good fiber. Such bad tips represent a significant waste of good preform glass in the tipping process.

The foregoing description of preferred embodiments of the invention should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims. It is expressly intended, for example, that all ranges broadly recited in this document include within their scope all narrower ranges which fall within the broader ranges. It is also expressly intended that, as is understood by those skilled in the art, certain steps included in the process may be omitted; certain additional steps may be added; and the order of the steps may be altered from the specific order described.

What is claimed:

1. An automated large outside diameter preform tipping process for yielding a tipped glass preform having predetermined tip geometries and shapes, reduced glass waste, and minimal clad-to-core waveguide distortion in the fiber drawn from the preform, the process comprising:
   creating a glass preform in an apparatus having a heating zone, a first holding unit adapted to hold one end of the preform, and a second holding unit adapted to hold the opposite end of the preform;
   heating an area of the glass preform in the heating zone, thereby initially softening the preform in that area;
   adjusting the temperature of the heating zone;
   positioning the preform relative to the heating zone in a tipping position by moving the first and the second holding units simultaneously in a synchronized manner;
   applying heat to the heating zone until the preform area softens;
   moving at least the second holding unit away from the heating zone along a predetermined non-linear velocity profile;
   once the velocity of the second holding unit achieves its maximum value, which creates a thinned glass strand in the area of the preform, at least reducing the temperature of the heating zone; and
   cutting the thinned glass strand to yield the tipped glass preform.

2. The preform tipping process of claim 1 wherein the glass preform is created by an upward collapse process.

3. The preform tipping process of claim 2 wherein the preform has an outside diameter of about 200 mm.

4. The preform tipping process of claim 1 wherein the step of adjusting the temperature of the heating zone includes reducing the temperature to cool the preform.

5. The preform tipping process of claim 1 wherein the step of positioning the preform relative to the heating zone positions the preform to one side of the center of the heating zone.

6. The preform tipping process according to claim 1 wherein the step of positioning the preform relative to the heating zone positions the midpoint of the preform at the center of the heating zone.

7. The preform tipping process of claim 1 wherein the tipping position is optimized by the use of FEM simulation.

8. The preform tipping process of claim 1 wherein the position of the first holding unit is changed in response to a load cell, with the position of the first holding unit changed until the load cell shows a zero load.

9. The preform tipping process of claim 8 wherein the heat is applied to the heating zone, thereby softening the preform area, until the slope of the reading of the load cell becomes zero.

10. The preform tipping process of claim 1 wherein the predetermined non-linear velocity profile approximates an exponential curve.

11. The preform tipping process of claim 1 wherein the predetermined non-linear velocity profile is defined by the use of FEM simulation.

12. The preform tipping process of claim 1 wherein the step of moving at least the second holding unit away from the heating zone along a predetermined non- linear velocity profile further includes moving the first holding unit away from the heating zone along the same predetermined non-linear velocity profile in a direction opposite that of the second holding unit.

13. The preform tipping process of claim 12 wherein the step of at least reducing the temperature of the heating zone includes turning the heating zone off and moving the first holding unit so that the first holding unit moves toward the heating zone and in the same direction as that of the second holding unit but at a smaller velocity.

14. The preform tipping process of claim 1 wherein the step of at least reducing the temperature of the heating zone includes turning the heating zone off and moving the first holding unit away from the heating zone in a direction opposite that of the second holding unit while the second holding unit completes its predetermined non-linear velocity profile.

15. The preform tipping process of claim 1 further comprising the step of managing one or more of the process steps by a controller.

16. The preform tipping process of claim 1, wherein the tipped glass preform yielded has a tip with a length extending parallel to a longitudinal axis of the preform, the length being approximately equal to the outside diameter of the preform.

* * * * *